US010055092B2

(12) United States Patent
Song et al.

(10) Patent No.: US 10,055,092 B2
(45) Date of Patent: Aug. 21, 2018

(54) ELECTRONIC DEVICE AND METHOD OF DISPLAYING OBJECT

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Mee-Sun Song, Seongnam-si (KR); Heon-Jin Park, Seoul (KR); Dong-Hwa Shin, Seoul (KR); Jin-Wook Seo, Seongnam-si (KR); Hyun-Joo Song, Seoul (KR); Myoung-Su Cho, Suwon-si (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 222 days.

(21) Appl. No.: 14/694,520

(22) Filed: Apr. 23, 2015

(65) Prior Publication Data

US 2015/0331560 A1    Nov. 19, 2015

(30) Foreign Application Priority Data

May 19, 2014  (KR) .................. 10-2014-0059887

(51) Int. Cl.
| | |
|---|---|
| G06F 3/00 | (2006.01) |
| G06F 3/0482 | (2013.01) |
| G06F 3/0484 | (2013.01) |
| G06F 3/0488 | (2013.01) |
| G06F 17/30 | (2006.01) |

(52) U.S. Cl.
CPC .......... *G06F 3/0482* (2013.01); *G06F 3/0484* (2013.01); *G06F 3/0488* (2013.01); *G06F 3/04842* (2013.01); *G06F 17/30601* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,423,933 | B2* | 8/2016 | Kim | |
| 2008/0034381 | A1* | 2/2008 | Jalon | G06F 17/30126 719/329 |
| 2008/0122796 | A1* | 5/2008 | Jobs | G06F 3/0488 345/173 |
| 2008/0168349 | A1* | 7/2008 | Lamiraux | G06F 3/0482 715/702 |
| 2009/0150791 | A1* | 6/2009 | Garcia | G06F 17/30873 715/738 |
| 2010/0002013 | A1* | 1/2010 | Kagaya | G06F 3/0231 345/619 |
| 2010/0077353 | A1* | 3/2010 | Moon | G06F 3/0482 715/832 |
| 2010/0298034 | A1* | 11/2010 | Shin | G06F 3/04883 455/566 |

(Continued)

*Primary Examiner* — Hien L Duong
(74) *Attorney, Agent, or Firm* — Jefferson IP Law, LLP

(57) ABSTRACT

An electronic device and a method of displaying an object are provided. The method of displaying an object includes displaying a plurality of objects on a screen, determining a plurality of objects corresponding to a selected item in accordance with selection of the item based on which the plurality of objects is classified, and displaying the plurality of determined objects on the screen.

18 Claims, 22 Drawing Sheets

(56) References Cited

U.S. PATENT DOCUMENTS

| | | | |
|---|---|---|---|
| 2010/0321406 A1* | 12/2010 | Iwase | G06F 3/04812 345/638 |
| 2011/0252061 A1* | 10/2011 | Marks | G06F 17/30864 707/771 |
| 2011/0265039 A1* | 10/2011 | Lyon | G06F 3/04855 715/830 |
| 2011/0280497 A1* | 11/2011 | Berger | G06F 17/30274 382/306 |
| 2012/0052921 A1* | 3/2012 | Lim | G06F 3/04883 455/566 |
| 2012/0110515 A1* | 5/2012 | Abramoff | G06F 17/30994 715/854 |
| 2013/0091471 A1 | 4/2013 | Gutt et al. | |
| 2014/0026088 A1* | 1/2014 | Monte | G01C 21/3682 715/765 |
| 2014/0104210 A1* | 4/2014 | Kim | G06F 3/0488 345/173 |

* cited by examiner

ELECTRONIC DEVICE AND METHOD OF DISPLAYING OBJECT

CROSS-REFERENCE TO RELATED APPLICATION(S)

This application claims the benefit under 35 U.S.C. § 119(a) of a Korean patent application filed on May 19, 2014 in the Korean Intellectual Property Office and assigned Ser. No. 10-2014-0059887, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., LTD., and 2) Seoul National University R&DB Foundation.

TECHNICAL FIELD

The present disclosure relates to an electronic device and a method of displaying an object.

BACKGROUND

Recently, various services and additional functions provided by an electronic device have been gradually expanded. In order to increase an effective value of the electronic device and meet various user demands, various applications executable by the electronic device have been developed.

Further, various objects, such as pictures, videos, and music files, may be stored in the electronic device, and a user may have a desire to more easily search for a desired object. According to the method of searching for an object in the current electronic device, an object may be searched for using several categories, such as a folder, a time, and a position, using one method at a time, so that in the case in which a user searches for a desired object among many objects, the electronic device is required to cross-search features between the objects and more easily and rapidly provide the desired object to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

As described above, in the related art, when a user desires to search for his/her desired object, the electronic device may search for the object by only one method at a time, but cannot search for an object using a more rapid and intuitive method and display the searched object to the user. For example, when a user searches for a picture, the user may classify the objects based on a person, a place, and a folder, and search for the object, but it is impossible to search for objects based on a specific item, and then search objects by moving to another item from the searched item. Accordingly, in the method of searching for an object and displaying the searched object on a screen, there is a need to search for or display an object so as to intuitively and conveniently display the object by dynamically linking items included in respective objects.

In accordance with an aspect of the present disclosure, a method of displaying an object is provided. The method includes displaying a plurality of objects on a screen, determining a plurality of objects corresponding to a selected item in accordance with selection of the item based on which the plurality of objects is classified, and displaying the plurality of determined objects on the screen.

In accordance with another aspect of the present disclosure, an electronic device that displays an object is provided. The electronic device includes a sceren configured to display a plurality of objects and a controller configured to determine a plurality of objects corresponding to a selected item in accordance with selection of the item based on which the plurality of objects is classified, and to display the plurality of determined objects.

In accordance with another aspect of the present disclosure, a non-transitory computer-readable storage medium that stores a program is provided. The computer-readable storage medium includes a command for displaying an object, including a first command set that displays a plurality of objects on a screen, a second command set that determines a plurality of objects corresponding to a selected item in accordance with selection of the item based on which the plurality of objects is classified, and a third command set that displays the plurality of objects on the screen.

Further, the present disclosure may include various embodiments implementable wihtin the scope of the present disclosure, in addition to the aforementioned embodiments.

According to the various embodiments of the present disclosure, it is possible to more easily search for an object by using an item included in the object, thereby and easily searching for various objects stored in an electronic device using various dimensions.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
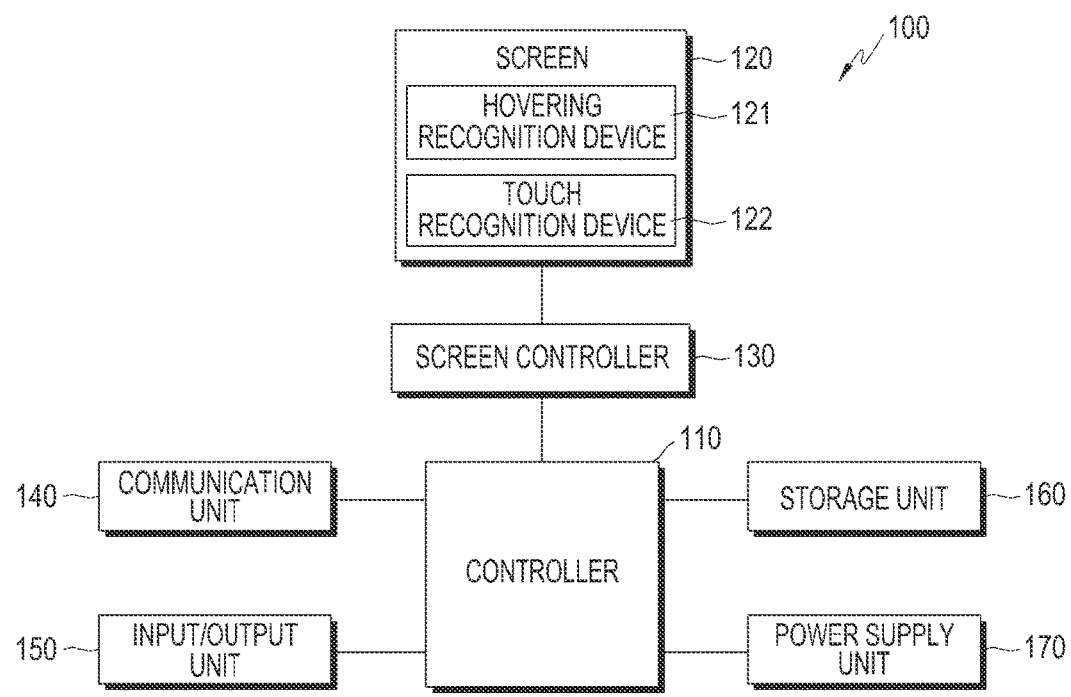
FIG. 1 is an example diagram illustrating an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including an ordinal number such as first, second, and/or the like can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

In the present disclosure, the terms are used to describe a specific embodiment, and are not intended to limit the present disclosure. Singular forms are intended to include plural forms unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning.

Hereinafter, an operation principle for an embodiment of the present disclosure will be described in detail with reference to the accompanying drawings. In the following description of embodiments of the present disclosure, a detailed description of known functions or configurations incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be determined based on the content throughout the specification.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is an example diagram illustrating an electronic device according to various embodiments of the present disclosure.

Referring to FIG. 1, an electronic device 100 may be connected with an external device (not shown) by using at least one of a communication unit 140, a connector (not shown), an earphone connecting jack (not shown), and/or the like. The external device may include various devices attached to or detached from the electronic device 100 through a wire, such as earphones, an external speaker, a Universal Serial Bus (USB) memory, a charger, a cradle/dock, a Digital Multimedia Broadcasting (DMB) antenna, a mobile payment related device, a health management device (blood sugar tester or the like), a game machine, a car navigation device, and/or the like. Further, the external device may include a Bluetooth communication device, a Near Field Communication (NFC) device, a WiFi Direct communication device, and a wireless Access Point (AP) which may wirelessly access a network. The electronic device may access another electronic device, such as a portable terminal, a smart phone, a tablet Personal Computer (PC), a desktop PC, a digitizer, an input device, a camera, a server, and/or the like by wire or wirelessly.

Referring to FIG. 1, the electronic device 100 may include at least one screen 120 and at least one screen controller 130. Further, the electronic device 100 may include a controller 110, the screen 120, the screen controller 130, the communication unit 140, an input/output unit 150, a storage unit 160, a power supply unit 170, and/or the like.

According to various embodiments of the present disclosure, one or more screens included in the electronic device may receive an input by at least one of a touch and a hovering.

The electronic device 100 may include at least one screen 120 which provides a user with a user interface corresponding to various services (e.g., a call, data transmission, broadcasting, photographing, an input of characters, and/or the like). Each screen includes a hovering recognition device 121 that recognizes an input through hovering of at least one of an input unit and a finger, and a touch recognition device 122 that recognizes (e.g., detects) an input through a touch of at least one of a finger and an input unit. The hovering recognition device 121 and the touch recognition device 122 may be respectively referred to as a hovering recognition panel and a touch panel. Each screen may transmit an analog signal, which corresponds to at least one touch or at least one hovering input in the user interface, to a corresponding screen controller. As described above, the electronic device 100 may include a plurality of screens, and each of the screens may include a screen controller receiving an analog signal corresponding to a touch or a hovering. According to various embodiments of the present disclosure, each screen may be connected with plural housings through hinge connections, respectively, or the plural screens may be located at one housing without the hinge connection. The electronic device 100 according to various embodiments of the present disclosure may include one or more screens as described above, and the electronic device 100 including one screen will be described hereinafter for ease of the description.

According to various embodiments of the present disclosure, the input unit 150 may include at least one of a finger, an electronic pen, a digital type pen, a pen including no integrated circuit, a pen including an integrated circuit, a pen including an integrated circuit and a memory, a pen capable of performing near field communication, a pen additionally including a ultrasonic detector, a pen including an optical sensor, a joystick, a stylus pen, and/or the like, which may provide a command or an input to the electronic device even in a contact state on a digitizer or a non-contact state, such as hovering.

According to various embodiments of the present disclosure, the controller 110 may include a Central Processing Unit (CPU), a Read Only Memory (ROM) storing a control program for controlling the electronic device 100, and a Random Access Memory (RAM) used as a storage area for storing a signal or data input from the outside of the electronic device 100 or for work performed in the electronic device 100. The CPU may include a single core type CPU, or a multi-core type CPU such as a dual core type CPU, a triple core type CPU, and a quad core type CPU.

Further, the controller 110 may control at least one of the screen 120, the hovering recognition device 121, the touch recognition device 122, the screen controller 130, the communication unit 140, the input/output unit 150, the storage unit 160, the power supply unit 170, and/or the like.

The controller 110 may determine whether hovering according to proximity of various input units to any object is recognized and identify (e.g., determine) the object corresponding to a location at which the hovering has occurred, in a state in which various objects or an input text is displayed on the screen 120. Further, the controller 110 may detect a height from the electronic device 100 to the input unit, and a hovering input event according to the height, in which the hovering input event may include at least one of the press of a button formed at the input unit, a tap on the input unit, a movement of the input unit at a speed higher than a predetermined speed, a touch on an object, and/or the like.

The controller 110 may detect at least one gesture using at least one of a touch and a hovering input to the screen 120. The gesture may include at least one of a swipe that moves a predetermined distance while maintaining a touch on the screen 120, a flick that quickly moves while maintaining a touch on the screen 120 and removes the touch from the screen 120, a swipe through hovering over the screen 120, a flick through hovering over the screen 120, and/or the like. In addition, the controller 110 may determine a direction of a gesture input into the screen 120. The controller 110 may detect at least one gesture from among the swipe that moves a predetermined distance while maintaining a touch on the screen 120, the flick that quickly moves while maintaining a touch on the screen and removes the touch from the screen 120, the swipe through hovering over the screen 120, and the flick through hovering over the screen 120, so as to determine a direction of the gesture. The controller 110 may determine a direction of a gesture provided through flicking or swiping on the screen 120, by determining a point on the screen 120 that is touched first and a point at which the gesture ends.

According to various embodiments of the present disclosure, the controller 110 may display a plurality of objects on the screen 120, may determine a plurality of objects corresponding to a selected item in accordance with selection of the item, based on which the plurality of objects is classified, and may display the plurality of determined objects on the screen 120.

The controller 110 may display one or more objects on the screen 120. The object may include various data, such as pictures, videos, emoticons, music files, and/or the like. Various items for a photographing time, a photographing place, and/or the like may be automatically included in each data and the data may be stored. Further, a feature or an item is written in each data by an input of a user and each data may be stored. The feature or the item may include information helpful for a user to recall or remember a memory about a photographed or received object. Further, the controller 110 may analyze a photographed or received object, and automatically write a feature or an item. For example, the controller 110 may determine whether a person included in the photographed picture is the same as a pre-stored person by driving a face recognition module. When the previously photographed and stored person is the same as the currently being photographed person as a result of the face recognition, the controller 110 may read an item (e.g., a name of the person) included in the previously photographed object, and may automatically write a result on the currently being photographed picture. In addition, the controller 110 may classify a plurality of objects stored in the storage unit 160 based on the features or items, and may display a result of the classification on the screen 120.

Further, the controller 110 may display one or more items, based on which the plurality of objects displayed on the screen 120, on one side of the screen 120. Further, one or more items may be updated in accordance with selection of a predetermined object from among the plurality of objects.

The controller 110 may analyze a feature or an item included in one or more objects which are pre-stored in the storage unit 160, received through the communication unit 140, or currently being photographed, and arrange one or more objects in an order including the same item. Further, the controller 110 may display a result of the arrangement on the screen 120. The controller 110 may display the analyzed item and the result of the arrangement on the screen 120 together. The plurality of objects displayed on the screen 120 may be objects arranged in accordance with the item displayed together on the screen 120. Further, when the controller 110 detects selection of a predetermined object among the plurality of displayed objects (e.g., in response to the controller 110 detecting selection of the predetermined object), the controller 110 analyzes at least one item included in the selected object, and reads a corresponding one or more objects from the storage unit 160 in accordance with the analyzed item. Further, the controller 110 may display one or more items included in the selected object on one side of the screen 120. As described above, according to various embodiments of the present disclosure, each object may include a plurality of items, the corresponding one or more objects may be selected or determined in accordance with the selection of the item, and the result of the selection or the determination may be displayed on the screen 120. Further, the controller 110 may display one or more items related to the selected or determined one or more objects on the screen 120.

Further, the controller 110 may determine a plurality of objects corresponding to the selected item in accordance with selection of the item based on which the plurality of objects is classified. When a predetermined item is selected in a state in which one or more items corresponding to one or more objects displayed on the screen 120 are displayed, the controller 110 may read one or more objects corresponding to the selected item from the storage unit 160, and display the read one or more objects on the screen 120. Further, when one or more objects read from the storage unit 160 are determined, the controller 110 may determine one or more items included in the determined one or more objects according to a priority, and may display the determined one or more items on the screen 120. When a predetermined object is dragged to a predetermined item in the state in which the one or more items corresponding to the one or more objects displayed on the screen 120 are displayed, so that the predetermined item is selected (e.g., in response to the predetermined object being dragged to the predetermined item), the controller 110 may read one or more objects corresponding to the selected item from the storage unit 160, and display the read one or more objects on the screen 120. Further, the item related to the displayed one or more objects may be displayed on the screen 120.

Further, according to various embodiments of the present disclosure, when a predetermined object is selected from the one or more objects displayed on the screen 120 (e.g., in response to detection of selection of the predetermined object), the controller 110 may display a plurality of objects corresponding to the item classified in accordance with the drag of the selected object to the item based on which the plurality of objects is classified. According to various embodiments of the present disclosure, when a predetermined object is selected from the one or more objects displayed on the screen 120 (e.g., in response to detection of selection of the predetermined object), the controller 110 may determine a plurality of objects corresponding to the classified item in accordance with the drag of the selected object to the item based on which the plurality of objects is classified, and may classify the plurality of objects according to one or more items included in the plurality of determined objects. Further, controller 110 may display one or more items of the object selected from the one or more objects displayed on the screen 120, and may display one or more objects including an item selected from the one or more displayed items. As described above, according to the various embodiments of the present disclosure, providing the corresponding object or a dynamic interface to another item in accordance with the selection of the one or more objects or items displayed on the screen 120 is possible.

Further, the controller 110 may display a plurality of determined objects on the screen 120. The controller 110 may display the one or more determined objects and one or more items included in the one or more determined objects on the screen 120 at the same time. The controller 110 may display one or more objects corresponding to selection of a predetermined object on the screen 120, and may display an item related to the plurality of displayed objects on one side of the screen 120. The item related to the plurality of objects is related to the selected object, and may include information helpful for the user to recall or remember the memory of the photographed or received object. The item may include any one of a time (e.g., day-on-day, month-on-month, and/or the like), a place (e.g., a sea, a mountain, a building, and/or the like), a location, a person, the name of a person, and the relationship of a person to the user, the like, or a result by a combination thereof.

According to various embodiments of the present disclosure, the screen 120 may receive at least one touch from the user's body (e.g., fingers including a thumb, and/or the like) or an input unit (e.g., a stylus pen, an electronic pen, and/or the like) capable of making a touch. Further, when an input is input using a pen, such as a stylus pen or an electronic pen, the screen 120 may include the hovering recognition device 121 recognizing hovering or the touch recognition device 122 recognizing a touch according to an input method.

The hovering recognition unit 121 may recognize (e.g., determine) a distance between a pen and the screen 120 through a magnetic field, an ultrasonic wave, optical information, or a surface acoustic wave, and the touch recognition unit 122 may detect a position at which a touch is input through an electric charge moved by the touch.

The touch recognition unit 122 may detect all of the touches capable of generating static electricity, and also may detect a touch of a finger or a pen which is an input unit.

In addition, the screen 120 may receive at least one gesture by at least one of a touch and a hovering. The gesture includes at least one of a touch, a tap, a double tap, a flick, a drag, a drag and drop, a swipe, multi swipes, pinches, a touch and hold, a shake, a rotating, and/or the like according to an input method. According to various embodiments of the present disclosure, the touch may be a gesture in which an input unit is placed on the screen 120, the tap may be a gesture in which the screen 120 is shortly and lightly tapped with the input unit, the double tap may be a gesture in which the screen 120 is quickly tapped twice, the flick may be a gesture (e.g., scrolling), in which the input unit is quickly moved on and taken off the screen 120, the drag may be a gesture in which a displayed object is moved or scrolled on the screen 120, the drag and drop may be a gesture in which an object is moved in a state of touching the screen 120 with an input unit, and the input unit is removed in a state that the movement of the object is stopped, the swipe may be a gesture in which the input unit is moved by a desired distance with a touch on the screen 120, the multi swipe may be a gesture in which at least two input units (or fingers) move by a desired distance in a state of touching the screen 120, the pinch may be a gesture in which at least two input units (or fingers) individually move in different directions in a state of touching the screen, the touch and hold may be a gesture in which a touch or a hovering on the screen 120 is held until an object such as a help balloon is displayed, the shake may be a gesture in which the electronic device is shaken in order to perform an operation, and rotating may be a gesture in which a direction of the screen 120 is converted from a portrait direction to a landscape direction, or from the landscape direction to the portrait direction. Further, according to various embodiments of the present disclosure, the gesture may include a swipe using a hovering on the screen 20 and a flick using a hovering on the screen 120, in addition to the swipe in which the input unit is moved by the desired distance in the state of touching the screen 120 and the flick in which the input unit is quickly moved in the state of touching the screen 120. Various embodiments of the present disclosure may be performed using at least one gesture, which includes a gesture by at least one of various touches and the hovering which the electronic device may recognize, as well as the above mentioned gesture.

Furthermore, the screen 120 may transmit an analog signal corresponding to at least one gesture to the screen controller 130.

Further, according to various embodiments of the present disclosure, the touch is not limited to contact between the screen 120 and a user's body or a touchable input unit, and may include non-contact (e.g., a detectable interval without the contact between the screen 120 and the user's body or the touchable input unit, and/or the like). The distance which can be detected by the screen 120 may be changed according to a capability or a structure of the electronic device 100. The touch screen 120 may be configured to distinctively output a touch event by a contact with a user's body or a touchable input unit, and the non-contact touch input (e.g., a hovering event). In other words, the touch screen 120 recognizes values (e.g., analog values including a voltage value and an electric current value), detected through the touch event and the hovering event in order to distinguish the hovering event from the touch event. Further, the screen 120 may output different detected values (e.g., a current value) based on a distance between the screen 120 and a space at which the hovering event is generated.

The hovering recognizing device 121 or the touch recognizing device 122 may be implemented by, for example, a resistive method, a capacitive method, an infrared method, an acoustic wave method, and/or the like.

Further, the screen 120 may include at least two touch screen panels which may detect touches or approaches of a body part of the user and the input unit, which may make a touch, respectively in order to sequentially or simultaneously receive inputs by the body part of the user and the input unit which may make a touch. The two or more screen panels provide different output values to the screen controller, and the screen controller may differently recognize the values input into the two or more touch screen panels to distinguish whether the input from the screen 120 is an input by the user's body or an input by the touchable input unit. The screen 120 may display at least one object or input character string.

According to various embodiments of the present disclosure, the screen 120 may have a structure including a touch panel which detects an input by a finger or an input unit (e.g., through a change of induced electromotive force) and a panel which detects a touch of a finger or an input unit on the screen 120, which are layered on each other closely or spaced from each other. The screen 120 may include a plurality of pixels, and display an image or notes input by the input unit or the finger through the pixels. A LCD, an Organic Light Emitting Diode (OLED), an LED, and/or the like may be used as the screen 120.

The screen 120 may have a plurality of sensors for identifying (e.g., detecting) a position of the finger or the input unit when the finger or the input unit touches or is spaced at a distance from a surface of the screen 120. The plural sensors may be individually formed to have a coil structure, and a sensor layer including the plural sensors may be formed so that each sensor has a predetermined pattern and a plurality of electrode lines is formed. The touch recognition unit 122 constructed as described above may detect a signal of which a waveform is deformed due to electrostatic capacity between the sensor layer and the input unit when the finger or the input unit touches the screen 120 (e.g., in response to the finger or the input unit touching the screen 120), and the screen 120 may transmit the detected signal to the controller 110. The screen 120, the screen controller 130, the controller 110, and/or the like may determine a predetermined distance between the input unit and the hovering recognition unit 121 through intensity of a magnetic field created by the coil, and/or the like.

The touch screen controller 130 converts analog signals received through a character string that is input to the screen 120, into digital signals (e.g., X and Y coordinates) and then transmits the digital signals to the controller 110. The controller 110 may control the screen 120 by using the digital signal received from the screen controller 130. For example, the controller 110 may allow a short-cut icon (not shown) or an object displayed on the screen 120 to be selected or executed in response to a touch event or a hovering event. Further, the screen controller 130 may also be included in the controller 110.

The touch screen controller 130 detects a value, for example, an electric current value and the like output through the touch screen 120, and identifies (e.g., determines) a distance between the touch screen 120 and the space in which the hovering event is generated. Then, the touch screen controller 130 converts a value of the identified (e.g., determined) distance into a digital signal (e.g., a Z coordinate), and provides the controller 110 with the digital signal.

The communication unit 140 may include a mobile communication unit (not shown), a sub communication unit (not shown), a wireless LAN unit (not shown), a near field communication unit (not shown), and/or the like. The communication unit 140 may communicate according to a communication method, a transmission distance, and the type of transceived data. The mobile communication unit permits the electronic device 100 to be connected with an external device through mobile communication by using at least one or one or more antennas (not shown) under the control of the controller 110. The mobile communication unit may transceive a wireless signal for a voice call, a video call, a Short Message Service (SMS), a Multimedia Messaging Service (MMS), and/or the like with a portable phone (not shown), a smart phone (not shown), a tablet PC, or another electronic device (not shown) having a telephone number input to the electronic device 100. The sub-communication unit includes at least one of the wireless LAN unit (not shown) and the short-range communication unit (not shown). For example, the sub-communication unit may include only the wireless LAN unit, or only the short-range communication unit, or both the wireless LAN unit and the short-range communication unit. Further, the sub-communication unit may transceive a control signal with the input unit. Further, the input unit may transmit a feedback signal for the received control signal received. The wireless LAN unit may access the Internet in a place at which a wireless (AP) (not shown) is installed, under the control of the controller 110. The wireless LAN unit supports the wireless LAN provision (IEEE802.11x) of the Institute of Electrical and Electronics Engineers (IEEE). The short-range communication unit may wirelessly perform short-range communication between the electronic device 100 and an image forming apparatus (not shown) under the control of the controller 110. The short range communication scheme may include a Bluetooth communication scheme, an Infrared Data Association (IrDA) communication scheme, a WiFi-Direct communication scheme, an NFC scheme, and/or the like.

The controller 110 may communicate with a near or remote communication device through at least one of the sub-communication unit and the wireless LAN unit, may receive and control various data including an image, an emoticon, a photograph, and/or the like through an Internet network, and may communicate with the input unit. The communication may be achieved by a transmission and reception of the control signal.

The electronic device 100 may include at least one of the mobile communication unit, the wireless LAN unit, the short-range communication unit, and/or the like. Further, the electronic device 100 may include a combination of the mobile communication unit, the wireless LAN unit, and the near field communication unit. According to various embodiments of the present disclosure, at least one of the mobile communication unit, the wireless LAN unit, the screen and the short-range communication unit, or a combination thereof is referred to as a transmission unit, and it does not limit the scope of the present disclosure.

Further, the input/output unit 150 includes at least one of a button (not shown), a microphone (not shown), a speaker (not shown), a vibration motor (not shown), a connector (not shown), a keypad (not shown), and/or the like. Each constituent element included in the input/output unit 150 may be displayed on the screen 120 to perform an input/output function, or be controlled. In addition, the input/output unit 150 may include at least one of an earphone connecting jack (not shown) and an input unit (not shown). The input/output unit 150 is not limited to those described above, and may include a cursor controller such as a mouse, a trackball, a joystick, cursor directional keys, a touchpad, and/or the like in order to control movement of a cursor on the screen 120 and communication with the controller 110. The keypad (not shown) in the input/output unit 150 may receive a key input from a user for controlling the electronic device 100. The keypad may include a physical keypad (not shown) formed in the electronic device 100, or a virtual keypad (not shown) displayed on the screen 120. The physical keypad (not shown) formed in the electronic device 100 may be excluded according to the performance or a structure of the electronic device 100.

According to various embodiments of the present disclosure, the storage unit 160 may store signals, objects, or data input/output in association with operations of the communication unit 140, the input/output unit 150, the screen 120, and the power supply unit 170, based on a control of the controller 110. The storage unit 160 may store a control program and applications for controlling the electronic device 100 or the controller 110. In addition, the storage unit 160 may include a plurality of objects, and the objects include various data such as pictures, maps, videos, music files, emoticons, and/or the like. The storage unit 160 may include a nonvolatile memory, a volatile memory, a Hard Disk Drive (HDD), or a Solid State Drive (SSD). The storage unit 160 is a non-transitory machine-readable medium (e.g., a non-transitory computer-readable medium). The term "the non-transitory machine-readable medium" may correspond to a medium capable of providing data to the machine so that the machine performs a specific function. The non-transitory machine readable medium may be a storage medium. The storage unit 160 may include a non-volatile medium and a volatile medium. All of the media should be of a tangible type that allows instructions transferred by the media to be detected by a physical instrument in which the machine reads the instructions into the physical instrument.

The power supply unit 170 may supply electric power to one or more batteries (not shown) disposed in the housing of the electronic device 100 under a control of the controller 110. The one or more batteries (not shown) supply electrical power to the electronic device 100. Further, the power supply unit 170 may supply, to the electronic device 100, electrical power input from an external power source (not shown) through a wired cable connected to a connector (not shown). Furthermore, the power supply unit 170 may supply electric power, which is wirelessly input from the external electric power source through a wireless charging technology, to the electronic device 100.

Figure 2:
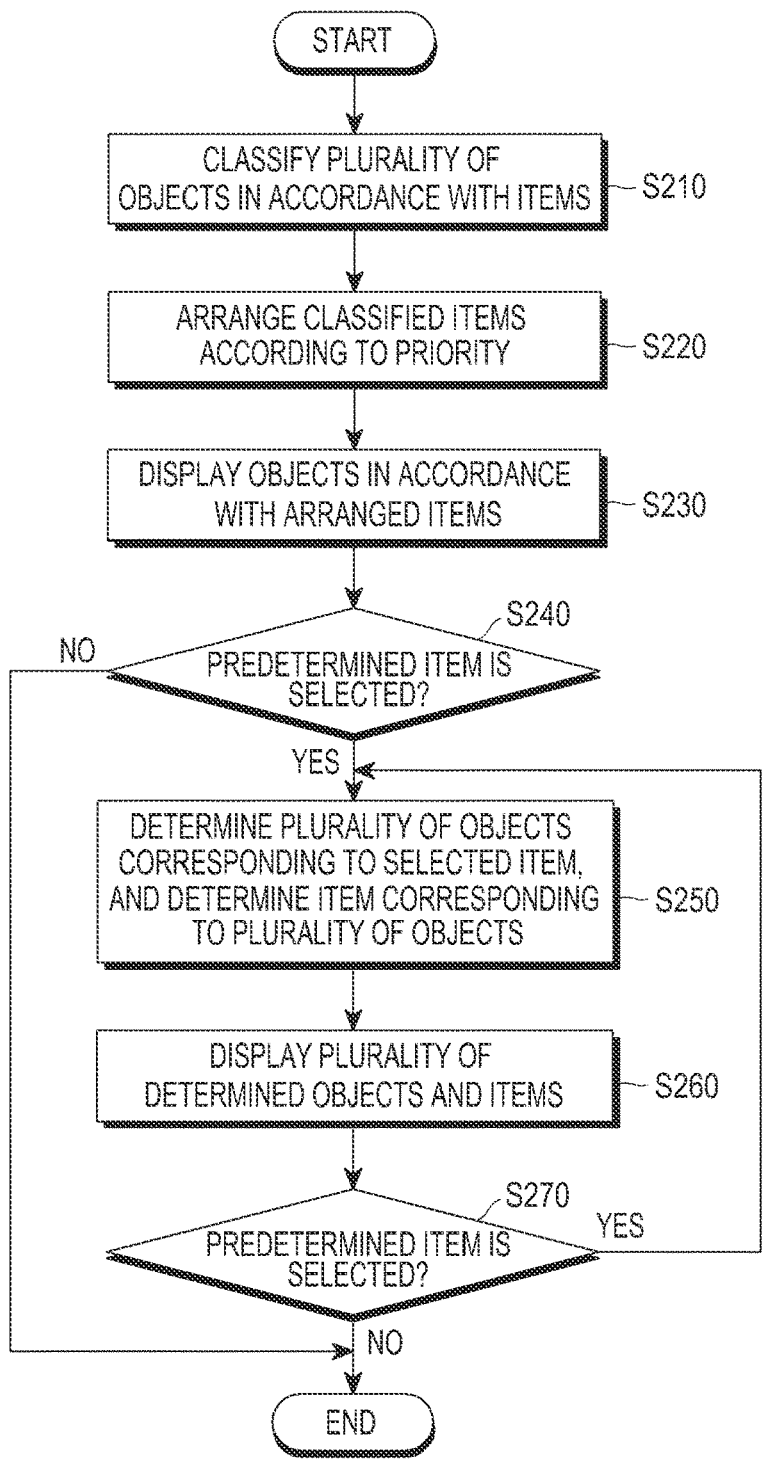
FIG. 2 is a flowchart illustrating a process of displaying an object according to an embodiment of the present disclosure.

FIG. 2 is a flowchart illustrating a process of displaying an object according to an embodiment of the present disclosure.

Hereinafter, a process of displaying an object according to an embodiment of the present disclosure will be described in detail.

At operation S210, the controller 110 classifies a plurality of objects in accordance with an item. The controller 110 may classify one or more objects pre-stored in the storage unit 160 in accordance with the item. Further, the controller 110 may determine and classify one or more objects corresponding to the selected item, and classify one or more items according to each object from the one or more determined objects. Further, the controller 110 may display the one or more classified objects on the screen 120 according to the item, and may display the one or more items on the screen. Further, when a predetermined object is selected from among the one or more displayed objects and is dragged to a predetermined item (e.g., in response to a selection of the predetermined object and dragging of the predetermined object to the predetermined item), the controller 110 analyzes the item, to which the predetermined object is dragged, reads one or more objects pre-stored in the storage unit 160, and displays the one or more read objects on the screen 120. Further, the controller 110 may analyze the item, to which the predetermined object is dragged, analyze items of one or more objects read from the storage unit 160, and update one or more items displayed on the screen 120.

At operation S220, the controller 110 arranges the classified items according to a priority. For example, the controller 110 aligns the classified items according to a priority. The controller 110 may analyze one or more items included in the selected object, and read one or more objects corresponding to the one or more analyzed items from the storage unit 160. Further, the objects may be displayed on the screen 120 considering the priority of the various items included in the one or more read objects.

At operation S230, the controller 110 displays the objects in accordance with the aligned items. The controller 110 may read one or more objects corresponding to each of the one or more items from the storage unit 160, and display the one or more objects on the screen 120 in accordance with an order of each item.

At operation S240, the controller 110 determines whether a predetermined item is selected.

If the controller 110 determines that the predetermined item is not selected at operation S240, then the controller 110 may end the process of displaying the object.

In contrast, if the controller 110 determines that the predetermined item is selected at operation S240, then the controller 110 may proceed to operation S250. When a predetermined item is selected in the state in which one or more objects are displayed in accordance with the aligned items, the controller 110 determines a plurality of objects corresponding to the selected item, and the items corresponding to the plurality of objects. The determined item is an item corresponding to the plurality of objects displayed in accordance with the selection of the item, and may be an item which is the same as or different from the item aligned at operation S230. The controller 110 may determine a plurality of objects corresponding to the selected item in accordance with selection of the item based on which the plurality of objects is classified. When a predetermined item is selected in a state in which one or more items corresponding to one or more objects displayed on the screen 120 are displayed, the controller 110 may read one or more objects corresponding to the selected item from the storage unit 160, and may display the read one or more objects on the screen 120. Further, when one or more objects read from the storage unit 160 are determined, the controller 110 may determine one or more items included in the determined one or more objects according to a priority, and may display the determined one or more items on the screen 120.

At operation 260, the plurality of determined objects and items are displayed. When a predetermined item is selected from the one or more items displayed on the screen 120 (e.g., in response to selection of the predetermined item), the controller 110 may display the selected item and one or more objects corresponding to the selected item.

At operation S270, the controller 110 may determine whether a predetermined item is selected.

If the controller 110 determines that the predetermined item is not selected at operation S270, then the controller 110 may end the process of displaying the object.

In contrast, if the controller 110 determines that the predetermined item is selected at operation S270, then the controller may return to operation S250. When a predetermined item is selected (e.g., in response to selection of the predetermined item), the process proceeds to operation S250 to determine a plurality of objects corresponding to the selected item and items corresponding to the plurality of objects, and the plurality of determined objects and items are displayed. As described above, according to the various embodiments of the present disclosure, providing the corresponding object or a dynamic interface to another item in accordance with the selection of the one or more objects or items displayed on the screen 120 is possible.

Figure 3:
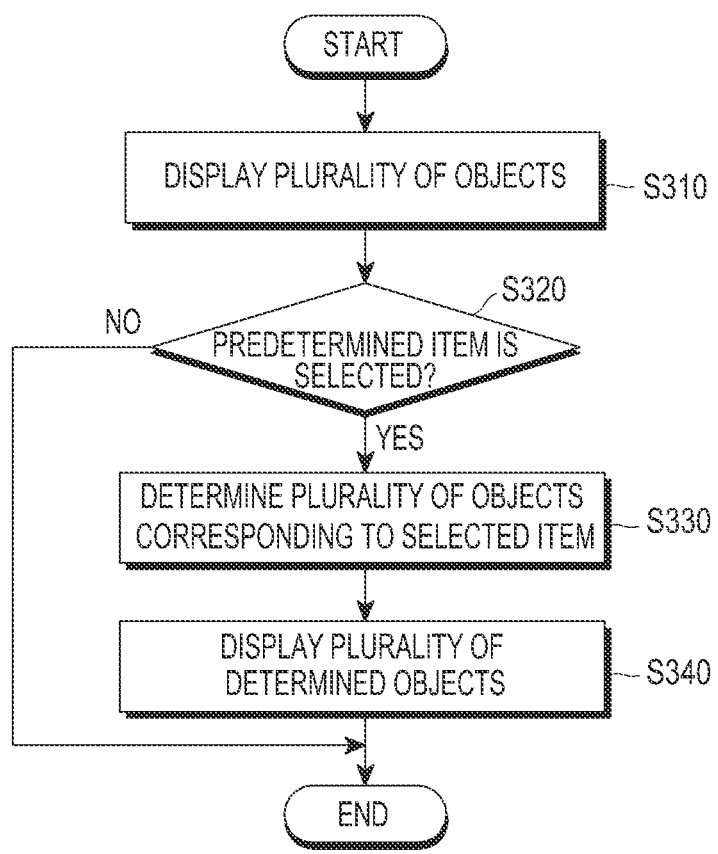
FIG. 3 is a flowchart illustrating a process of displaying an object according to an embodiment of the present disclosure.

FIG. 3 is a flowchart illustrating a process of displaying an object according to an embodiment of the present disclosure.

Hereinafter, a process of displaying an object according to another embodiment of the present disclosure will be described in detail.

At operation S310, a plurality of objects is displayed. The controller 110 may display one or more objects on the screen 120. The object may include various data, such as pictures, videos, emoticons, music files, and/or the like. Items including the photographing time, a photographing place, and/or the like may be automatically included in each data and the data may be stored, and a feature or an item may be written on each data by an input of a user and the data may be stored. The feature or the item may include various pieces of information helpful for a user to recall or remember a memory about a photographed or received object. Further, the controller 110 may analyze a photographed or received object, and automatically write a feature or an item. For example, the controller 110 may determine whether a person included in the photographed picture is the same as a pre-stored person by driving a face recognition module, and/or the like. Further, the controller 110 may analyze one or more objects included in a photographed picture and video, or a received picture or video through a recognition algorithm, and/or the like. When the previously photographed and stored person is the same as the currently being photographed person as a result of the face recognition (e.g., in n response to determining the person being photographed corresponds to a previously stored person), the controller 110 may read an item (e.g., the name of the person) included in the previously photographed object, and may automatically write a result of the read on the currently being photographed picture. Further, the controller 110 may classify a plurality of objects stored in the storage unit 160 based on the features or items, and may display a classified result on the screen 120.

According to various embodiments of the present disclosure, the controller 110 may display one or more items, based on which the plurality of objects displayed on the screen 120, on one side of the screen 120. Further, one or more items may be updated in accordance with the selection of a predetermined object from among the plurality of objects. The controller 110 may analyze a feature or an item included in one or more objects which are pre-stored in the storage unit 160, received through the communication unit 140, or currently being photographed, and may arrange one or more objects in an order including the same item. Further, the controller 110 may display a result of the arrangement on the screen 120. Further, the controller 110 may display the analyzed item and the result of the arrangement on the screen 120. The plurality of objects displayed on the screen 120 may be objects arranged so as to correspond to the item displayed together on the screen 120. Further, when the controller 110 detects selection of a predetermined object among the plurality of displayed objects (e.g., in response to selection of a predetermined object), the controller 110 analyzes at least one item included in the selected object, and reads corresponding one or more objects from the storage unit 160 in response to the analyzed item. The controller 110 may display one or more items included in the selected object on one side of the screen 120. As described above, according to various embodiments of the present disclosure, each object may include a plurality of items, the corresponding one or more objects may be selected or determined in response to the selection of the item, and the result of the selection or the determination may be displayed on the screen 120.

At operation S320, the controller 110 may determine whether a predetermined item is selected.

If the controller 110 determines that the predetermined item is not selected at operation S320, then the controller may end the process of displaying the object.

In contrast, if the controller 110 determines that the predetermined item is selected at operation S320, then the controller 110 may proceed to operation S330 at which the controller 110 determines a plurality of object corresponding to a selected item. For example, when a predetermined item is selected (e.g., in response to selection of the predetermined item), the controller 110 determines a plurality of objects corresponding to the selected item, and displays the plurality of determined objects. The controller 110 may determine a plurality of objects corresponding to the selected item in accordance with selection of the item based on which the plurality of objects is classified. When a predetermined item is selected in a state in which one or more items corresponding to one or more objects displayed on the screen 120 are displayed, the controller 110 may read one or more objects corresponding to the selected item from the storage unit 160, and may display the read one or more objects on the screen 120. Further, when one or more objects read from the storage unit 160 are determined, the controller 110 may determine one or more items included in the determined one or more objects according to a priority, and may display the determined one or more items on the screen 120. When a predetermined object is dragged to a predetermined item in the state in which the one or more items corresponding to the one or more objects displayed on the screen 120 are displayed, so that the predetermined item is selected (e.g., in response to the predetermined object being dragged to the predetermined item), the controller 110 may read one or more objects corresponding to the selected item from the storage unit 160, and may display the read one or more objects on the screen 120.

At operation S340, the controller 110 may display a plurality of determined objects. For example, when a predetermined object is selected from the one or more objects displayed on the screen 120 (e.g., in response to selection of the predetermined object), the controller 110 may display a plurality of objects corresponding to the item classified in accordance with the drag of the selected object to the item based on which the plurality of objects is classified. According to various embodiments of the present disclosure, when a predetermined object is selected from the one or more objects displayed on the screen 120 (e.g., in response to of the predetermined object), the controller 110 may determine a plurality of objects corresponding to the classified item in accordance with the drag of the selected object to the item based on which the plurality of objects is classified, and may classify the plurality of objects according to one or more items included in the plurality of determined objects. Further, controller 110 may display one or more items of the object selected from the one or more objects displayed on the screen 120, and may display one or more objects including an item selected from the one or more displayed items. As described above, according to the various embodiments of the present disclosure, providing the corresponding object or a dynamic interface to another item in accordance with the selection of the one or more objects or items displayed on the screen 120 is possible.

Figure 4:
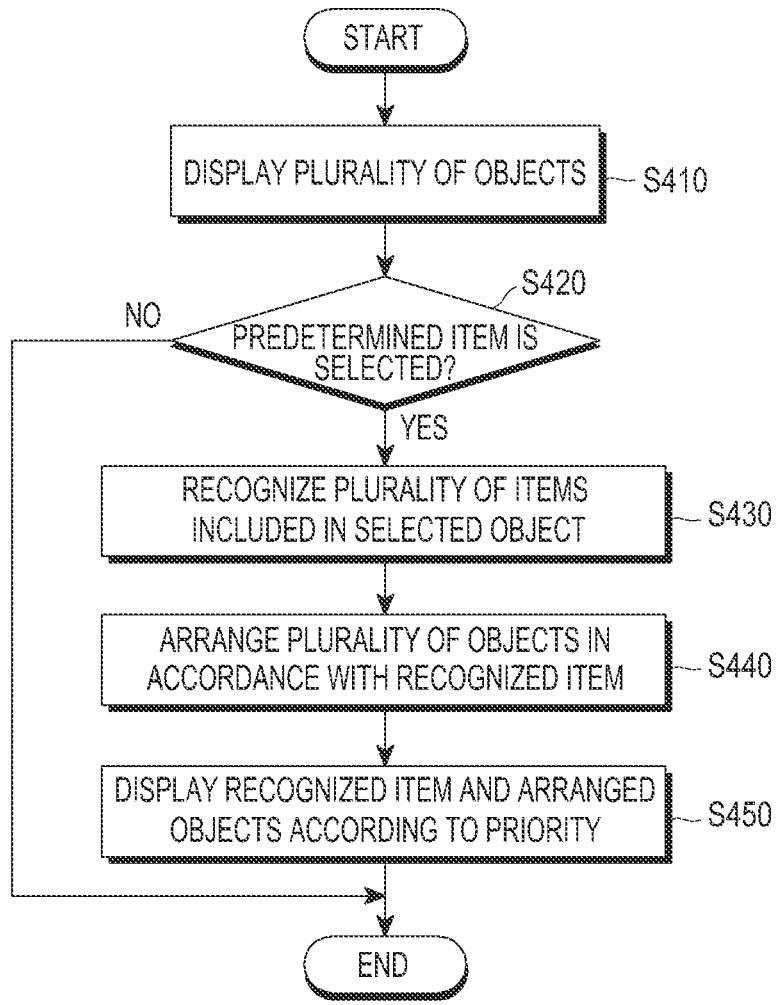
FIG. 4 is a flowchart illustrating a process of displaying an object according to an embodiment of the present disclosure.

FIG. 4 is a flowchart illustrating a process of displaying an object according to an embodiment of the present disclosure.

Hereinafter, a process of displaying an object according to an embodiment of the present disclosure will be described in detail.

At operation S410, a plurality of objects is displayed. The controller 110 may display one or more objects on the screen 120. The controller 110 may display one or more items included in each of the displayed objects on the screen 120, as well as the one or more objects. According to various embodiments of the present disclosure, each of the objects may include various pieces of information helpful for a user to recall or remember a memory about a photographed or received object. Further, the controller 110 may analyze a photographed or received object, and may automatically write a feature or an item. In addition, the controller 110 may classify a plurality of objects stored in the storage unit 160 based on the features or items, and may display a result of the classification on the screen 120.

The controller 110 may display one or more items, based on which the plurality of objects is displayed on the screen 120, on one side of the screen 120. Further, one or more items may be updated so as to correspond to selection of a predetermined object among the plurality of objects. The controller 110 may analyze a feature or an item included in one or more objects which are pre-stored in the storage unit 160, received through the communication unit 140, or currently being photographed, and arrange one or more objects in an order including the same item. Further, the controller 110 may display a result of the arrangement on the screen 120. Further, the controller 110 may display the analyzed item and the result of the arrangement on the screen 120. The plurality of objects displayed on the screen 120 may be objects arranged so as to correspond to the item displayed together on the screen 120. Further, when the controller 110 detects selection of a predetermined object among the plurality of displayed objects (e.g., in response to selection of the predetermined object), the controller 110 analyzes at least one item included in the selected object, and reads corresponding one or more objects from the storage unit 160 in response to the analyzed item. Further, the controller 110 may display one or more items included in the selected object on one side of the screen 120. As described above, according to various embodiments of the present disclosure, each object may include a plurality of items, the corresponding one or more objects may be selected or determined in response to the selection of the item, and the result of the selection or the determination may be displayed on the screen 120.

At operation S420, the controller 110 may determine whether a predetermined item is selected.

If the controller 110 determines that a predetermined item is not selected at operation S420, then the controller 110 may end the process of displaying an object.

In contrast, if the controller 110 determines that the predetermined item is selected at operation S420, then the controller 110 may proceed to operation S430 at which the controller 110 recognizes (e.g., determines) a plurality of items included in (or otherwise associated with) the selected object. For example, when a predetermined object is selected (e.g., in response of the predetermined object), the controller 110 recognizes (e.g., determines) a plurality of items included in the selected object. The controller 110 may detect the selection of the predetermined object from among the one or more objects displayed on the screen 120. Further, the controller 110 may detect that the predetermined object is selected and then dragged. Further, the controller 110 may detect that the selected predetermined object is dragged to one or more items displayed on one side of the screen 120. When the controller 110 detects that the selected predetermined object is dragged to one or more items (e.g., in response to the selected predetermined object being dragged to one or more items), the controller 110 may read one or more objects corresponding to the one or more items from the storage unit 160, and may display the one or more read objects on the screen 120. Further, the controller 110 may analyze various items included in the one or more read objects, may align the analyzed items according to the priority, and may display the aligned items on one side of the screen 120. When the controller 110 detects that a predetermined object displayed on the screen is selected and is dragged to a predetermined item (e.g., in response to selection of the predetermined object and a dragging of the predetermined object to the predetermined item), the controller 110 may recognize one or more items included in the selected object.

At operation S440, the controller 110 may arrange the plurality of objects in accordance with a recognized item. Thereafter, at operation S450, the controller 110 may display a recognized item and arranged objects according to priority. For example, the controller 110 aligns the plurality of objects in accordance with the recognized item, and displays the recognized item and the aligned objects in accordance with the priority. The controller 110 may align the one or more objects read from the storage unit 160 in accordance with the recognized item, and may display the aligned one or more objects on the screen 120. Further, the controller 110 may analyze various items included in the one or more read objects, and may display the analyzed items on the screen 120 according to the priority. Further, the controller 110 may display the one or more determined objects and one or more items included in the one or more determined objects on the screen 120 at the same time. Further, the controller 110 may display one or more objects corresponding to the selection of the predetermined object on the screen 120, and may display items related to the plurality of displayed objects on one side of the screen 120.

Figure 5:
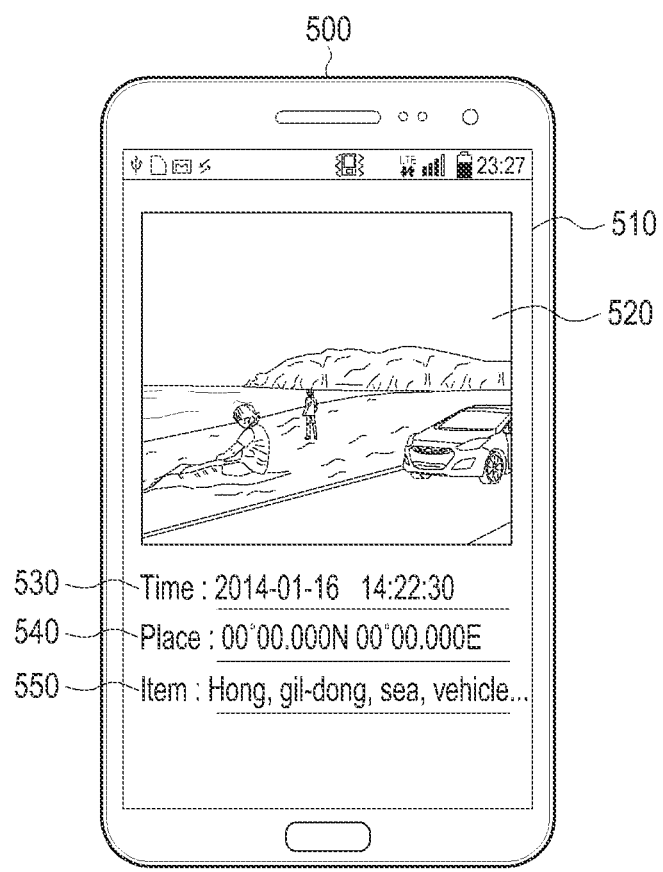
FIG. 5 is an example diagram of the display of an object including one or more items according to an embodiment of the present disclosure.

FIG. 5 is an example diagram of the display of an object including one or more items according to an embodiment of the present disclosure.

Referring to FIG. 5, an electronic device 500 may display an object 520 on a screen 510. The object 520 may include one or more items 530, 540, and 550. The items included in the object 520 may include a time 530, a place 540, and an item (or feature, information) 550. For example, the time 530 may represent a date or a time at which the object 520 is photographed, and the place 540 may represent information, or GPS information on a location, at which the object 520 is photographed. Further, the item 550 may be automatically written or written by a user by recognizing a person or an object included in the object received or photographed by the electronic device 500.

According to various embodiments of the present disclosure, the controller 110 may recognize a person or an object included in the object, such as a picture, a video, a music file, an emoticon, and/or the like through a recognition algorithm. Further, the controller 110 may determine whether the corresponding person or object is the same as the person or the object included in pre-stored one or more objects. Through the recognition, the controller 110 may automatically write the item to the currently being photographed or received object by using various items of the pre-stored object. The controller 110 may prompt a user to confirm whether to write the item to the currently being photographed or received object.

FIG. 5 illustrates by example the case in which the object 520 is a picture photographed at a beach. The controller 110 may determine that a person existing in the picture is HONG, Gil-Dong, the picture is taken with a background of the sea, and an automobile is included in the photographed picture by recognizing the photographed picture. Further, the controller 110 may automatically write the various items determined as described above. Further, the controller 110 may form a link with one or more objects stored in the storage unit 160, which have the same item as the one or more items of the object 520.

Figure 6:
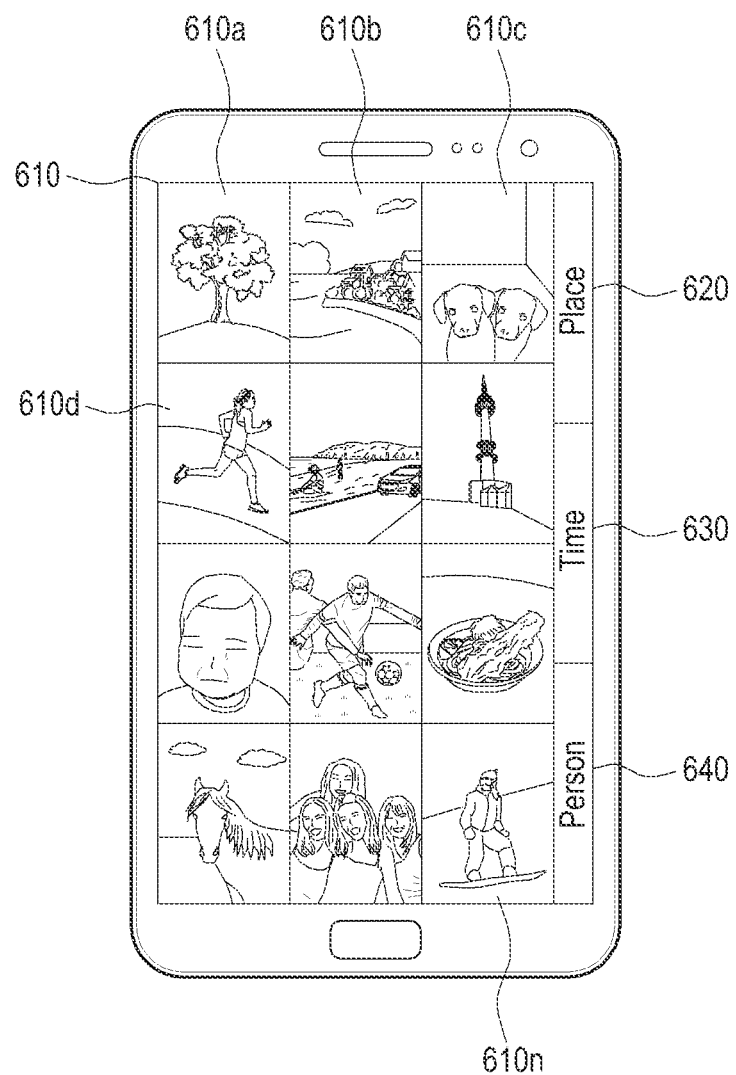
FIG. 6 is an example diagram of the display of one or more objects and one or more items on a screen according to an embodiment of the present disclosure.

FIG. 6 is an example diagram of the display of one or more objects and at one or more items on the screen according to an embodiment of the present disclosure.

Referring to FIG. 6, the controller 110 may display a plurality of objects 610*a* to 610*n* on the screen 610. Further, the controller 110 may display a plurality of items 620, 630, and 640 corresponding to the plurality of objects displayed on the screen 610 on one side of the screen 610.

The plurality of objects may include various pictures, such as a tree picture 610*a*, a house landscape picture 610*b* having the sea as a background, a picture of dogs 610*c*, and a picture of a running person 610*d*. Further, the controller 110 analyzes respective items included in the various displayed objects and recognizes an item with the same category. Further, the controller 110 may display the plurality of objects on one side of the screen 610 in an order of an item having the largest frequency or a highest priority. For example, the plurality of objects displayed on the screen 610 commonly includes a place item 620, a time item 630, and a person item 640. The controller 110 may analyze the item included in each object, and display the plurality of objects in an order of an item, which is included in the largest number of objects, or according to the priority, or designation by a user.

FIGS. 7A to 7F are example diagrams illustrating a process of displaying an object according to an embodiment of the present disclosure.

Figure 7A:
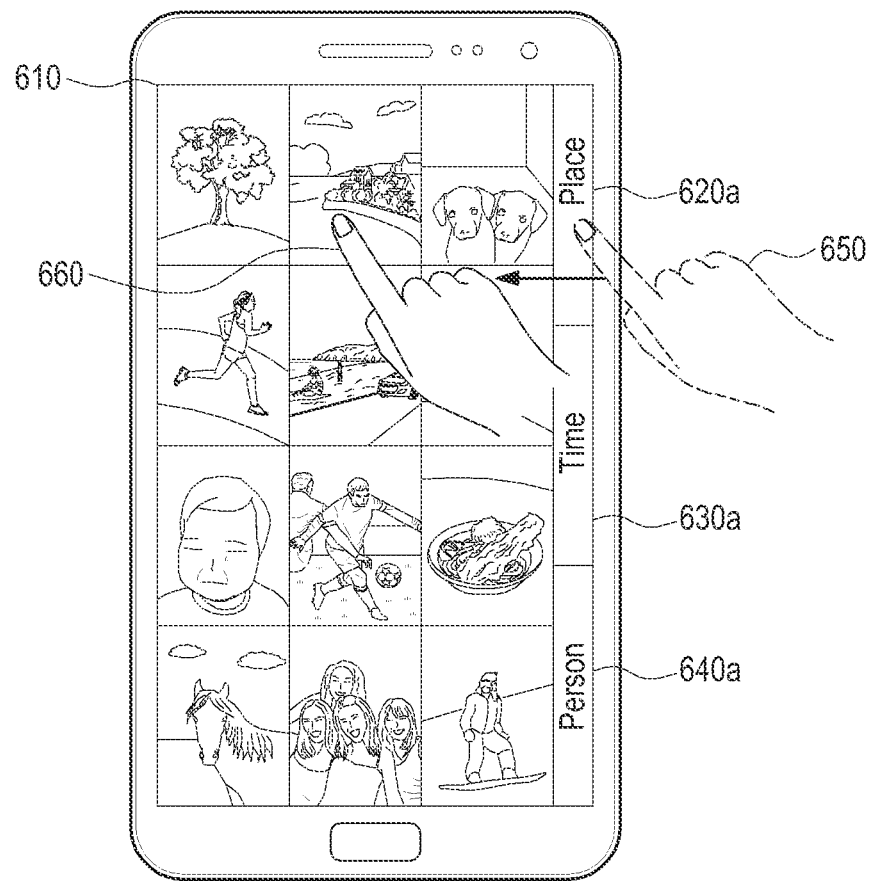
FIG. 7A is an example diagram illustrating a process of selecting a place item according to an embodiment of the present disclosure.
Figure 7B:
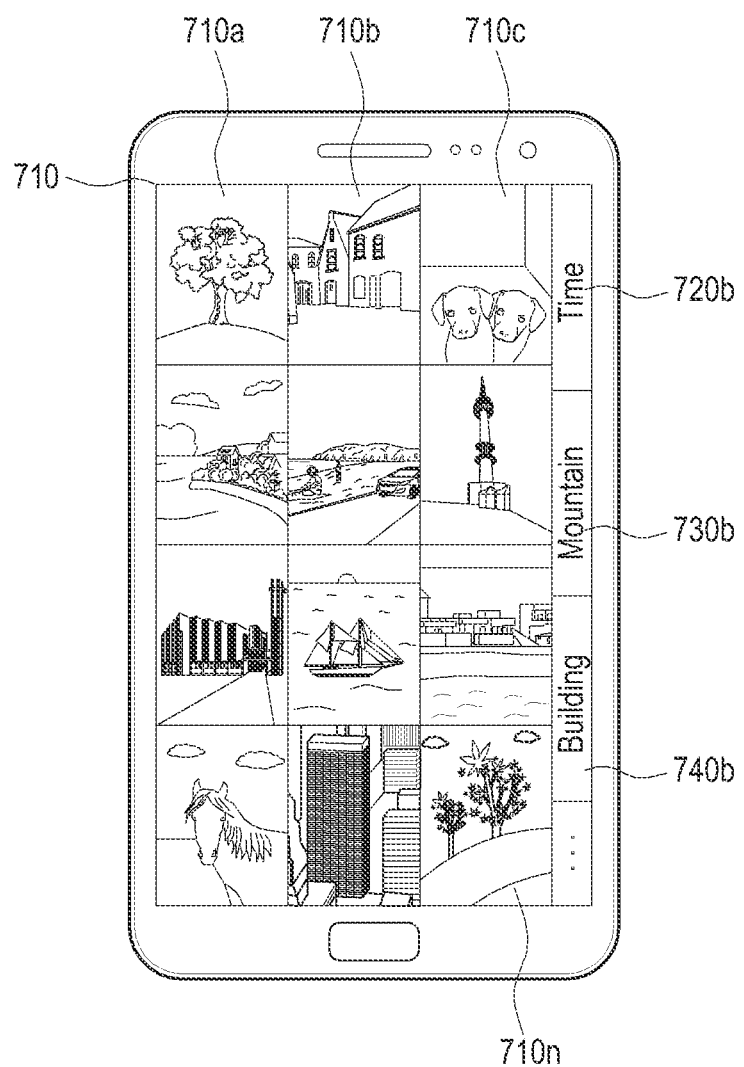
FIG. 7B is an example diagram illustrating a result of the case in which the place item is selected according to an embodiment of the present disclosure.
Figure 7C:
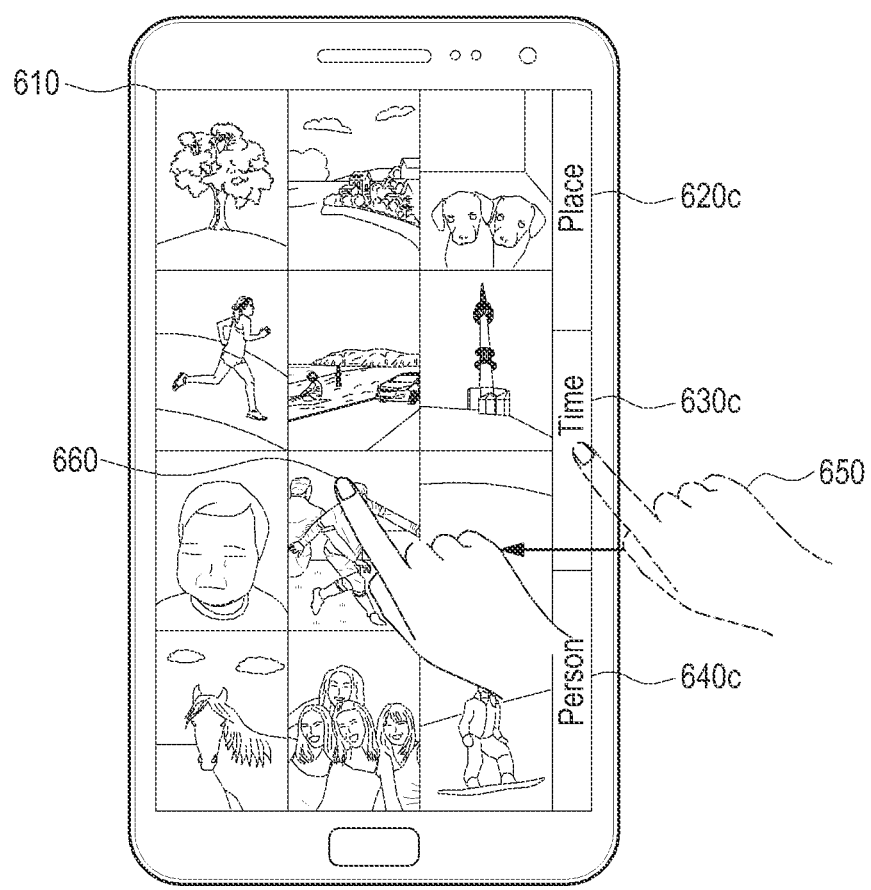
FIG. 7C is an example diagram illustrating a process of selecting a time item according to an embodiment of the present disclosure.
Figure 7D:
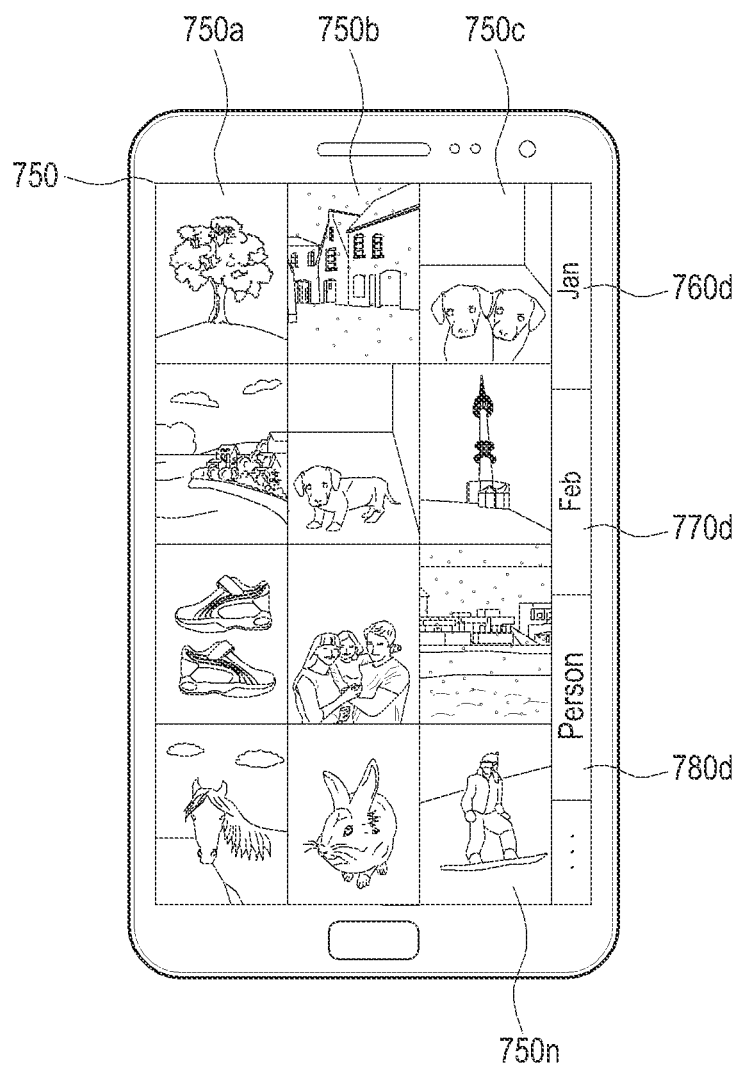
FIG. 7D is an example diagram illustrating a result of the case in which the time item is selected according to an embodiment of the present disclosure.
Figure 7E:
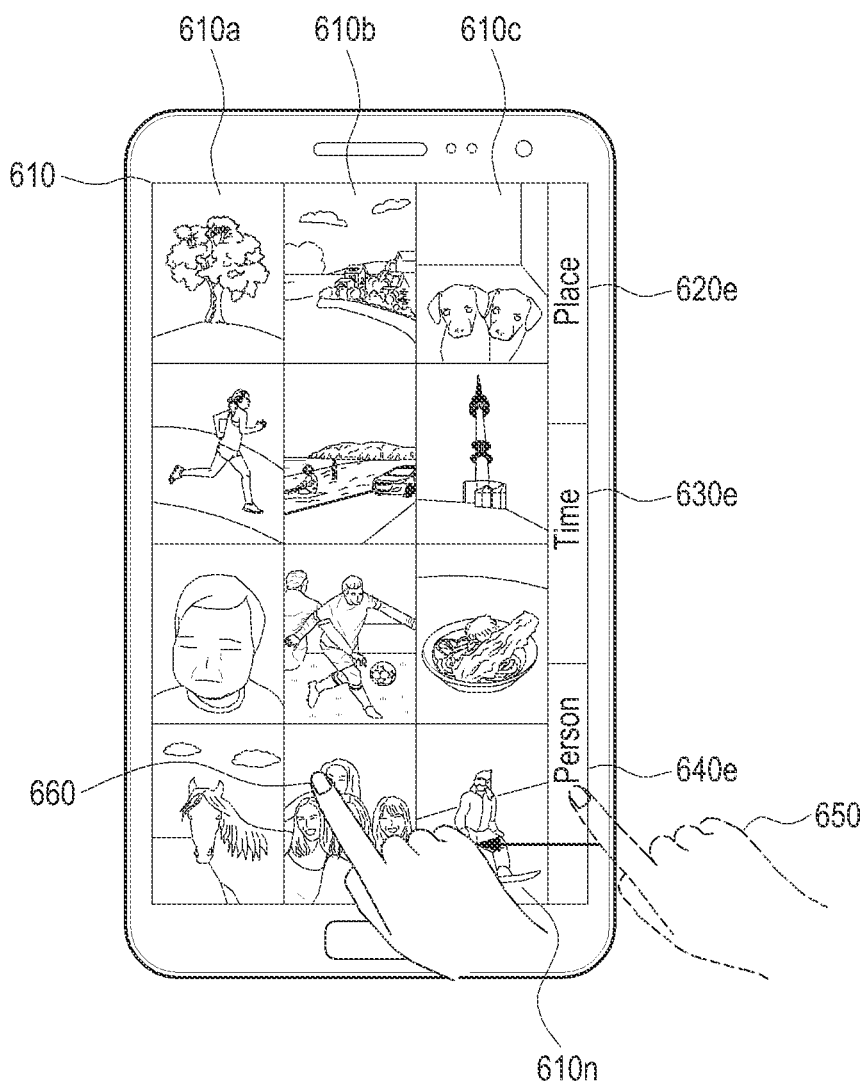
FIG. 7E is an example diagram illustrating a process of selecting a person item according to an embodiment of the present disclosure.
Figure 7F:
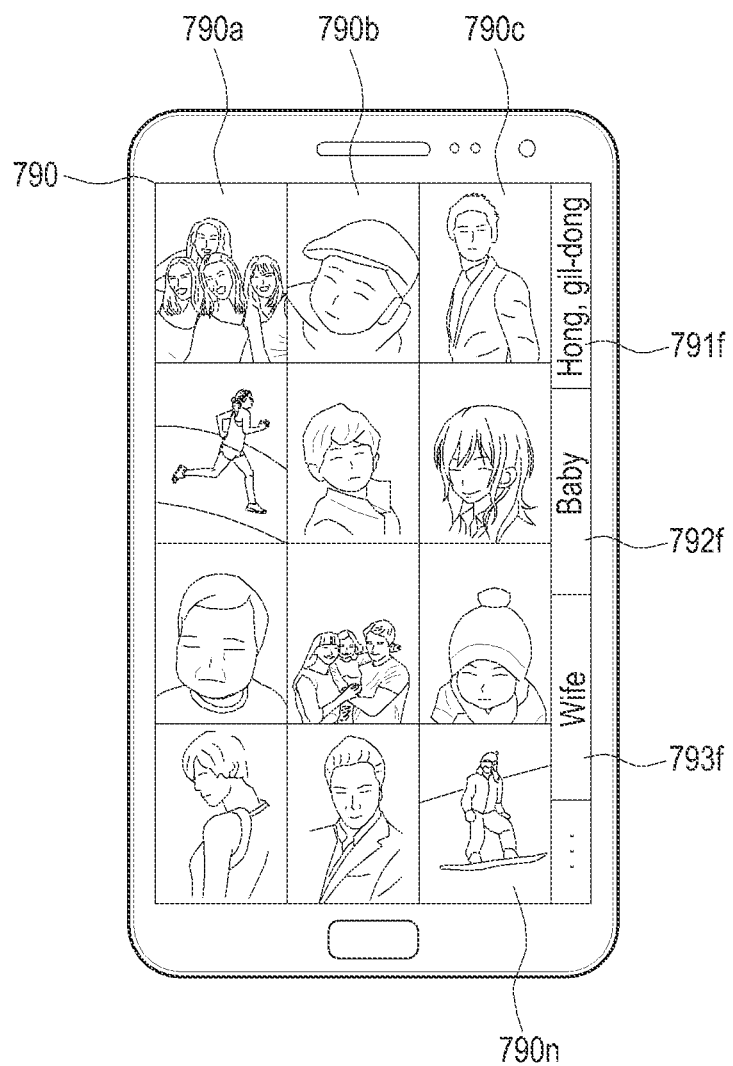
FIG. 7F is an example diagram illustrating a result of the case in which the person item is selected according to an embodiment of the present disclosure.

Referring to FIGS. 7A to 7F, FIG. 7A is an example diagram illustrating a process of selecting a place item according to an embodiment of the present disclosure, FIG. 7B is an example diagram illustrating a result of a case in which the place item is selected according to an embodiment of the present disclosure, FIG. 7C is an example diagram illustrating a process of selecting a time item according to an embodiment of the present disclosure, FIG. 7D is an example diagram illustrating a result of a case in which the time item is selected according to an embodiment of the present disclosure, FIG. 7E is an example diagram illustrating a process of selecting a person item according to an embodiment of the present disclosure, and FIG. 7F is an example diagram illustrating a result of a case in which the person item is selected according to an embodiment of the present disclosure.

Referring to FIG. 7A, a plurality of objects is displayed on the screen 610, and one or more items (e.g., the place item 620*a*, the time item 630*a*, and the person item 640*a*) are the same in the plurality of displayed objects. Each item may include information helpful for a user to recall or remember a memory about a photographed or received object. The controller 110 may analyze the one or more items included in the plurality of objects displayed on the screen 610. Further, the controller 110 may analyze the one or more items included in the plurality of objects displayed on the screen 610, and may determine a position, at which the one or more items are displayed, according to the item, which is included in the largest number of objects, or a predetermined priority. As illustrated in FIG. 7A, the items included in the plurality of displayed objects among the various items may have an order of the place item 620*a*, the time item 630*a*, and the person item 640*a*. The controller 110 displays the various items on one side of the screen 610 according to the order.

FIG. 7A illustrates the display of the plurality of items on the right side of the screen 610. However, such a display is merely an example and according to various embodiments of the present disclosure, the plurality of items may be displayed on any of the upper, lower, left, and right sides, as well as the right side of the screen 610. The controller 110 may detect that the place item 620*a* is selected on the screen 610, and may detect that the place item 620*a* is dragged to a partial region of the screen 610 (650→660). Further, the controller 110 may detect that the place item 620*a* is selected and moved by various gestures by a hovering, as well as a drag by a touch. For example, when the place item 620*a* is selected as denoted by reference numeral 650, and is dragged to the partial region of the screen 610, and then the drag is released as denoted by reference numeral 660, the controller 110 may recognize (e.g., determines) an intention that a user currently desires to display a plurality of objects corresponding to the place item 620*a*. When the controller 110 recognizes (e.g., determines) the intention (e.g., in response to determining the intention), the controller 110 may display the plurality of objects corresponding to the place item 620*a* as illustrated in FIG. 7B. Further, when the controller 110 detects a drag (660→650) in a direction different from the direction of the drag (650→660), the controller 110 may display a screen image which is a screen image before the detection of the drag (650→660).

Referring to FIG. 7B, when the place item 620*a* is selected and is dragged (650→660) to the predetermined region on the screen 610 (e.g., in response to selection of the place item 620*a* and being dragged to the predetermined region), the controller 110 reads corresponding objects, which include places in the item, from various objects pre-stored in the storage unit 160, and displays the read objects. Further, the controller 110 analyzes various items included in the read objects, and displays the analyzed items on one side of a screen 710 by various methods, such as a priority. For example, when the place item 620*a* is selected in FIG. 7A, the place item may generally include items related to the selected place 620*a*, such as a mountain, the sea, a field, an inside of a building. Further, when the place item 620 is selected (e.g., in response to selection of the place item 620), the place item 620 may include an item by the one or more displayed objects. The controller 110 reads objects corresponding to the place item, and classifies the read objects according to the item. The screen 710 displays a plurality of objects corresponding to items (e.g., a time 720*b*, a mountain 730*b*, and a building 740*b*) related to the place item 620 on the screen 710. The controller 110 displays a plurality of objects (e.g., objects 710*a*, 710*b*, 710*c*, . . . , and 710*n*) corresponding to the related items on the screen 710. The plurality of objects (e.g., objects 710*a*, 710*b*, 710*c*, . . . , and 710*n*) may be one or more objects related to the selected item 620 in FIG. 7A. The controller 110 displays corresponding items (e.g., a time, a mountain, and a building) on the screen 710 considering a priority and the like of the plurality of objects (e.g., objects 710*a*, 710*b*, 710*c*, . . . , and 710*n*). The display of one or more objects corresponding to the selected item or the display of the one or more items related to the display may be repeatedly performed.

Referring to FIG. 7C, a plurality of objects is displayed on the screen 610, and one or more items (e.g., the place item 620*c*, the time item 630*c*, and the person item 640*c*) are the same in the plurality of displayed objects. Each item may include information helpful for a user to recall or remember a memory about a photographed or received object. The controller 110 may analyze the one or more items included in the plurality of objects displayed on the screen 610. Further, the controller 110 may analyze the one or more items included in the plurality of objects displayed on the screen 610, and determine a position, at which the one or more items are displayed, according to the item, which is included in the largest number of objects, or a predetermined priority.

As illustrated in FIG. 7C, the items included in the plurality of displayed objects among the various items may have an order of the place item 620c, the time item 630c, and the person item 640c. The controller 110 displays the various items on one side of the screen 610 according to the order. FIG. 7C illustrates the display of the plurality of items on the right side of the screen 610. However, such a display of the plurality of items is merely an example, and according to various embodiments of the present disclosure, the plurality of items may be displayed on any of the upper, lower, left, and right sides, as well as the right side of the screen 610. The controller 110 may detect that the time item 630c is selected, and detect that the time item 630c is dragged to a partial region of the screen 610 (650→660). Further, the controller 110 may detect that the time item 630c is selected and moved by various gestures by a hovering, as well as a drag by a touch. For example, when the time item 630c is selected as denoted by reference numeral 650, and is dragged to the partial region of the screen 610, and then the drag is released as denoted by reference numeral 660 (e.g., in response to selection of the time item 630 and a dragging of the time item), the controller 110 may recognize (e.g., determine) an intention that a user currently desires to display the plurality of objects corresponding to the time item 630c. When the controller 110 recognize the intention (e.g., in response to determining the intention), the controller 110 may display the plurality of objects corresponding to the time item 630c as illustrated in FIG. 7D. Further, when the controller 110 detects a drag (660→650) in a direction different from the direction of the drag (650→660), the controller 110 may display a screen image which is a screen image before the detection of the drag (650→660).

Referring to FIG. 7D, when the time item 630c is selected and is dragged (650→660) to the predetermined region on the screen 610 in FIG. 7C, the controller 110 reads corresponding objects, which include time in the item, from various objects pre-stored in the storage unit 160, and displays the read objects. Further, the controller 110 analyzes various items included in the read objects, and displays the analyzed items on one side of a screen 750 by various methods, such as a priority. For example, when the time item 630c is selected in FIG. 7C, the time may be generally classified based on month-on-month, such as, January, February, and March, or day-on-day, such as the first day, the second day, and the third day. Further, the time may be classified based on a time zone. When it is assumed that the time item 630c is classified based on month-on-month, the time item 630c may include an item related to the time item 630c, such as January 760d and February 770d. Further, when the time item 630c is selected, the time item 630c may include an item by the one or more displayed objects. The controller 110 may read objects corresponding to the time item from the storage unit 160, and classify the read objects according to the item. The screen 750 displays a plurality of objects corresponding to the items (e.g., January 760d, February 770d, and a person 780d) related to the time item 630 on the screen 750. The controller 110 displays a plurality of objects (e.g., objects 750a, 750b, 750c, . . . , and 750n) corresponding to the items related to the time item 630 on the screen 750. The plurality of objects (e.g., objects 750a, 750b, 750c, . . . , and 750n) may be one or more objects related to the item 630 selected in FIG. 7C. The controller 110 displays the corresponding items (e.g., January, February, and a person) on the screen 750 considering a priority and the like of the plurality of objects (e.g., objects 750a, 750b, 750c, . . . , and 750n). The display of one or more objects corresponding to the selected item or the display of the one or more items related to the display may be repeatedly performed. Further, the present disclosure may display items related to one or more objects displayed by the drag (650→660) in FIG. 7C on the screen 750, in addition to the aforementioned items (e.g., January 760d, February 770d, and a person 780d). Further, when a predetermined object is selected from the plurality of objects displayed on the screen 750 (e.g., in response to selection of the predetermined object), the controller 110 may analyze the time item of the selected object, and may display one or more objects photographed within a predetermined time before and after the selected object on the screen 750. Further, when the item (e.g., January 760d) is selected (e.g., in response to selection of the item), the controller 110 may display a list of pictures or videos photographed in January among the plurality of objects stored in the storage unit 160.

Referring to FIG. 7E, a plurality of objects is displayed on the screen 610, and one or more items (e.g., the place item 620e, the time item 630e, and the person item 640e) are the same in the plurality of displayed objects. Each item may include information helpful for a user to recall or remember a memory about a photographed or received object. The controller 110 may analyze the one or more items included in the plurality of objects displayed on the screen 610. Further, the controller 110 may analyze the one or more items included in the plurality of objects displayed on the screen 610, and may determine a position, at which the one or more items are displayed, according to the item, which is included in the largest number of objects, or a predetermined priority.

As illustrated in FIG. 7E, the items included in the plurality of displayed objects among the various items may have an order of the place item 620e, the time item 630e, and the person item 640e. The controller 110 displays the various items on one side of the screen 610 according to the order. FIG. 7E illustrates the display of the plurality of items on the right side of the screen 610. However, such a display is merely an example and according to various embodiments of the present disclosure, the plurality of items may be displayed on any of the upper, lower, left, and right sides, as well as the right side of the screen 610.

The controller 110 may detect that the person item 640e is selected, and detect that the person item 640e is dragged to a partial region of the screen 610 (650→660). Further, the controller 110 may detect that the person item 640e is selected and moved by various gestures by a hovering, as well as a drag by a touch. For example, when the person item 640e is selected as denoted by reference numeral 650, and is dragged to the partial region of the screen 610, and then the drag is released as denoted by reference numeral 660 (e.g., in response to selection of the person item 640e and a dragging to the partial region of the screen 610), the controller 110 may recognize (e.g., determine) an intention that a user currently desires to display the plurality of objects corresponding to the person item 640e. When the controller 110 recognize the intention (e.g., in response to the controller determining the intention), the controller 110 may display the plurality of objects corresponding to the person item 640e as illustrated in FIG. 7F. Further, when the controller 110 detects a drag (660→650) in a direction different from the direction of the drag (650→660), the controller 110 may display a screen image which is a screen image before the detection of the drag (650→660).

Referring to FIG. 7F, when the person item 640e is selected and is dragged (650→660) to the predetermined region on the screen 610 in FIG. 7E, the controller 110 reads corresponding objects, which include information related to a person in the item, from various objects pre-stored in the storage unit 160, and displays the read objects. Further, the controller 110 analyzes various items included in the read objects, and displays the analyzed items on one side of a screen 790 by various methods, such as a priority. For example, when the person item 640e is selected in FIG. 7E, the person item may include various items related to the person item 640e, such as a name of a person and a relation with a user. Further, the person item may include an item (e.g., a baby 792) by one or more objects displayed in accordance with the selection of the person item 640e. The controller 110 may read objects corresponding to the person item from the storage unit 160, and classify the read objects according to the item. The screen 790 displays a plurality of objects corresponding to items (e.g., HONG, Gil-Dong 791f, a baby 792f, and a wife 793f) related to the person item 640 on the screen 790. The controller 110 displays a plurality of objects (e.g., objects 790a, 790b, 790c, . . . , and 790n) corresponding to the items related to the person item 640 on the screen 790. The plurality of objects (e.g., objects 790a, 790b, 790c, . . . , and 790n) may be one or more objects related to the item 640 selected in FIG. 7E. The controller 110 displays the corresponding items (e.g., HONG, Gil-Dong, the baby, and the wife) on the screen 790 considering a priority and/or the like of the plurality of objects (e.g., objects 790a, 790b, 790c, . . . , and 790n). The display of one or more objects corresponding to the selected item or the display of the one or more items related to the display may be repeatedly performed.

According to various embodiments of the present disclosure, items related to one or more objects displayed by the drag (650→660) in FIG. 7E may be displayed on the screen 790, in addition to the aforementioned items (e.g., HONG, Gil-Dong, the baby, and the wife). Further, when a predetermined object is selected from the plurality of objects displayed on the screen 790 (e.g., in response to selection of the predetermined object), the controller 110 may analyze the person item of the selected object, and may display one or more objects photographed within a predetermined time before and after the selected object on the screen 790. Further, when the item (e.g., a baby 792f) is selected (e.g., in response to selection of the item), the controller 110 may display a list of pictures or videos corresponding to the baby among the plurality of objects stored in the storage unit 160.

FIG. 8 is an example diagram illustrating a process of displaying an object according to an embodiment of the present disclosure.

Figure 8A:
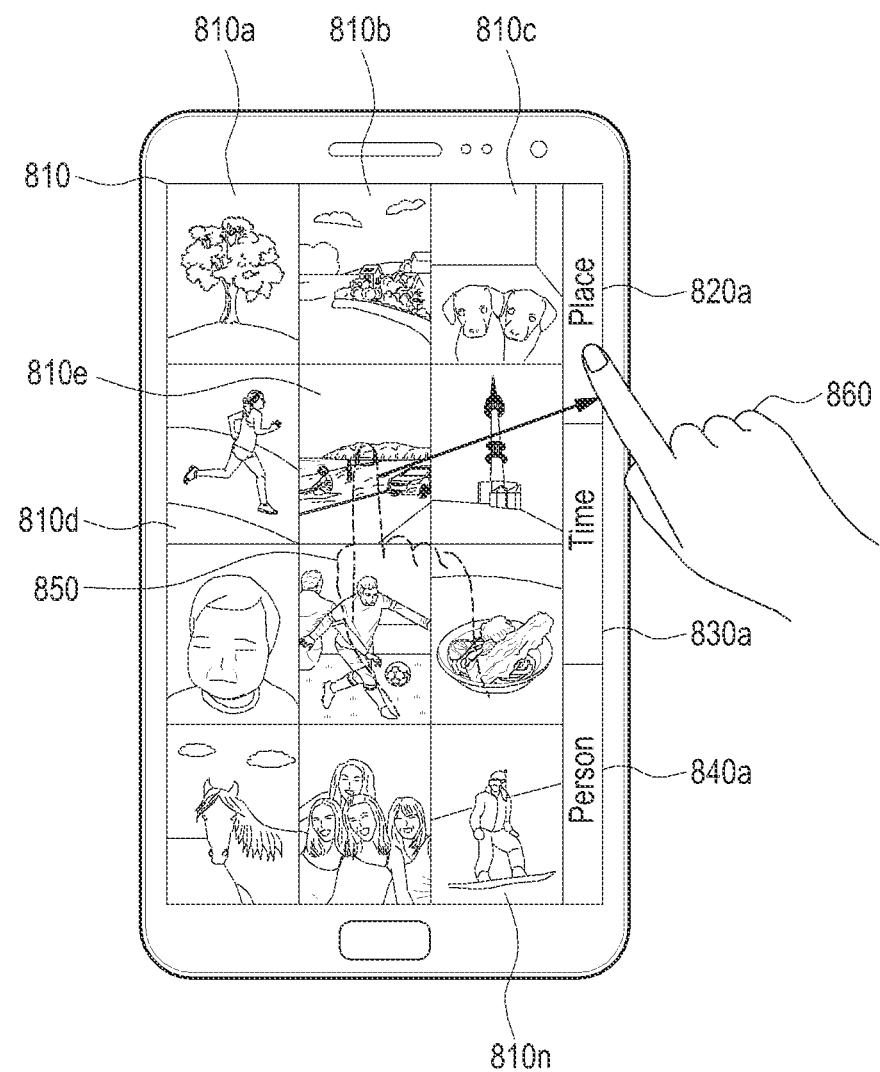
FIG. 8A is an example diagram illustrating a process of selecting an object and dragging the selected object to the place item according to an embodiment of the present disclosure.
Figure 8B:
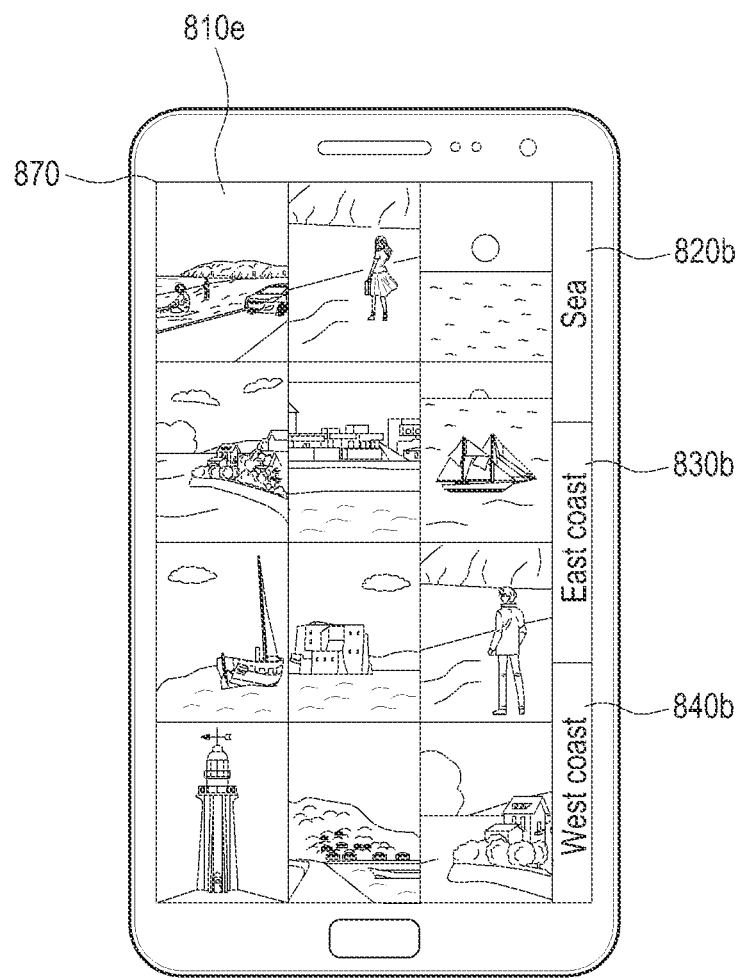
FIG. 8B is an example diagram illustrating a result of the case in which an object is selected and moved to the place item according to an embodiment of the present disclosure.
Figure 8C:
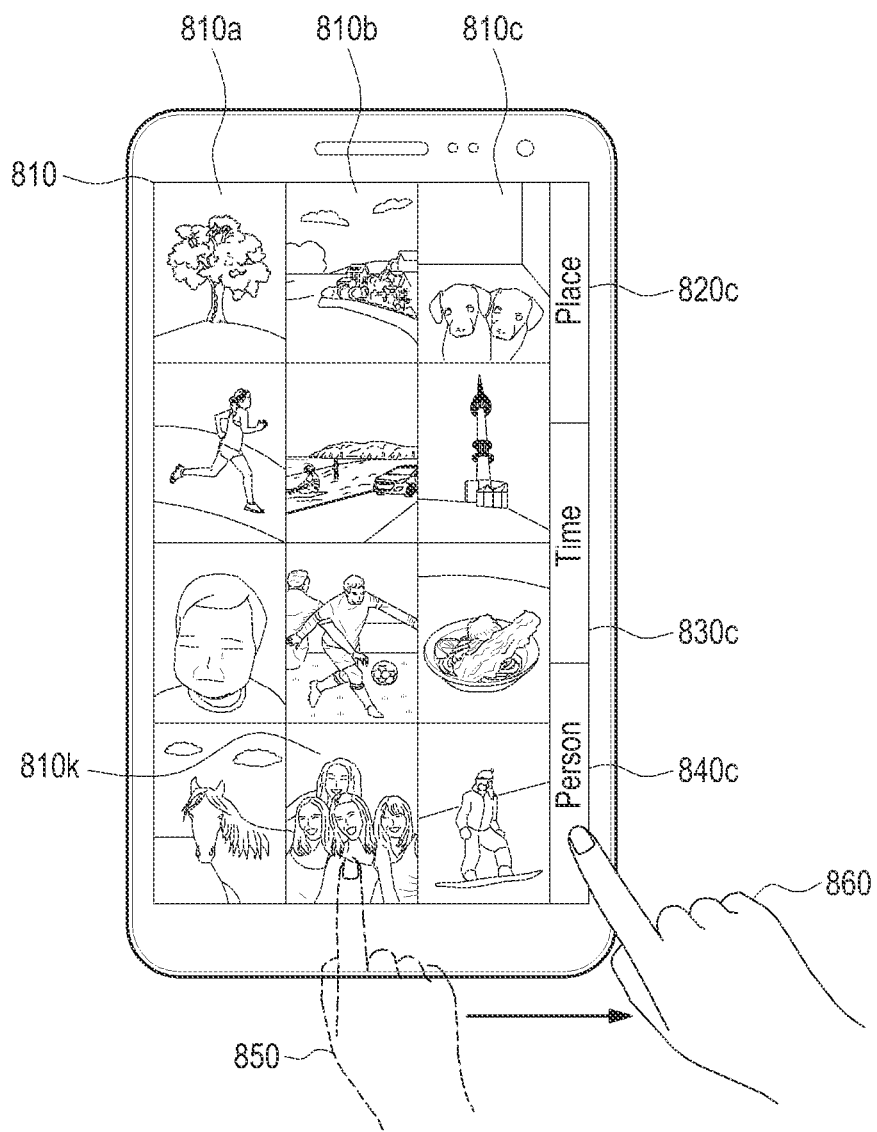
FIG. 8C is an example diagram illustrating a process of selecting an object and dragging the selected object to the person item according to an embodiment of the present disclosure.
Figure 8D:
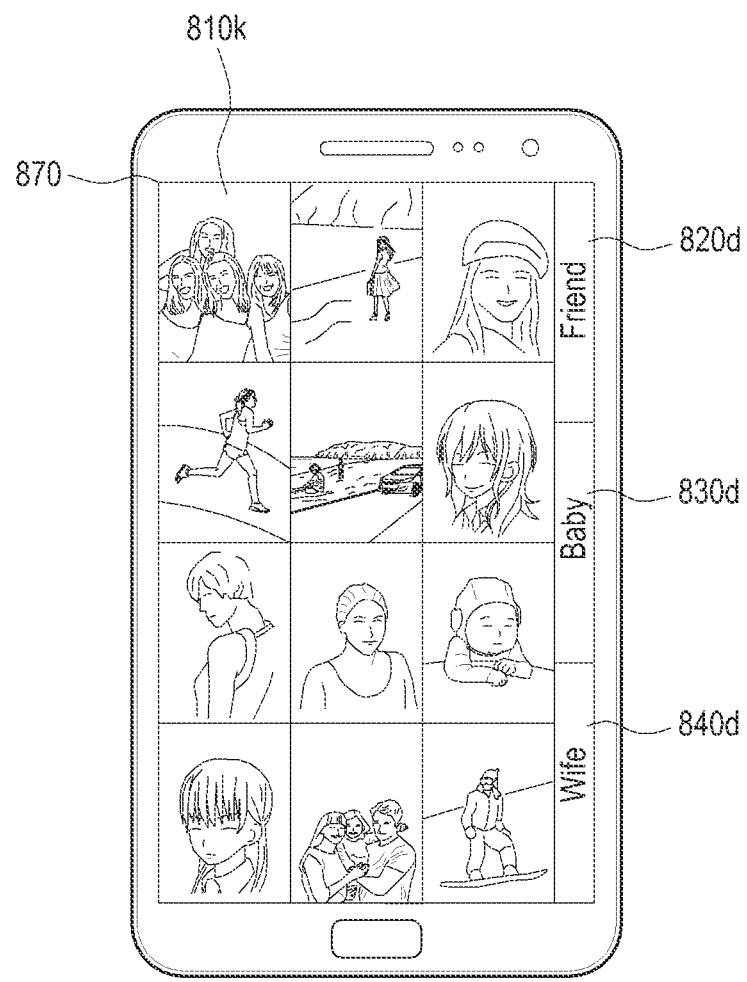
FIG. 8D is an example diagram illustrating a result of the case in which an object is selected and moved to the person item according to an embodiment of the present disclosure.

Referring to FIG. 8, FIG. 8A is an example diagram illustrating a process of selecting an object and dragging the selected object to the place item according to an embodiment of the present disclosure, FIG. 8B is an example diagram illustrating a result of the case in which an object is selected and moved to the place item according to an embodiment of the present disclosure, FIG. 8C is an example diagram illustrating a process of selecting an object and dragging the selected object to the person item according to an embodiment of the present disclosure, and FIG. 8D is an example diagram illustrating a result of the case in which an object is selected and moved to the person item according to an embodiment of the present disclosure.

Referring to FIG. 8A, a plurality of objects (e.g., objects 810a, 810b, 810c, 810d, 810e, . . . 810n) is displayed on a screen 810, and one or more items (e.g., a place item 820a, a time item 830a, and a person item 840a) are the same in the plurality of displayed objects. Each item may include information helpful for a user to recall or remember a memory about a photographed or received object. The controller 110 may analyze the one or more items included in the plurality of objects displayed on the screen 810. Further, the controller 110 may analyze the one or more items included in the plurality of objects displayed on the screen 810, and determine a position, at which the one or more items are displayed, according to the item, which is included in the largest number of objects, or a predetermined priority.

As illustrated in FIG. 8A, the items included in the plurality of displayed objects among the various items may have an order of the place item 820a, the time item 830a, and the person item 840a. The controller 110 displays the various items on one side of the screen 810 according to the order. FIG. 8A illustrates the display of the plurality of items on the right side of the screen 810. However, such a display is merely an example and according to various embodiments of the present disclosure, the plurality of items may be displayed on any of the upper, lower, left, and right sides, as well as the right side of the screen 810. The controller 110 may detect that at least one object (e.g., an object 810e) is selected on the screen 810, and detect that the selected object 810e is dragged to the place item 820a displayed on the right side of the screen 810. Further, the controller 110 may detect that the object 810e is moved to the place item 820a by various gestures by a hovering, as well as a drag by a touch. For example, when the object 810e is selected as denoted by reference numeral 850, and is dragged to the partial region of the screen 810, and then the drag is released as denoted by reference numeral 860 (e.g., in response to selection of the object 810e and dragging to the partial region of the screen 810), the controller 110 may recognize (e.g., determine) an intention that a user currently desires to display the plurality of objects having the same place as that of the object 810e. Further, when the controller 110 recognize the intention (e.g., in response to the controller determining the intention), the controller 110 may display the plurality of objects corresponding to the same place as that of the selected object 810e as illustrated in FIG. 8B.

Referring to FIG. 8B, when the object 810e is selected, and is dragged (850→860) to the place item 820a displayed on a screen 870 (e.g., in response to selection of the object 810e and dragging to the place item 820a), the controller 110 reads one or more objects having the same place as the place of the selected object 810e among the various objects pre-stored in the storage unit 160, and displays the read objects. Further, the controller 110 analyzes various items included in the read objects, and displays the analyzed items on one side of the screen 870 by various methods, such as a priority. For example, when the object 810e is selected in FIG. 8A (e.g., in response to selection of the object 810a), the controller 110 analyzes a place at which the selected object 810e is photographed. Further, the controller 110 analyzes one or more people or objects included in the selected object 810a by adopting the recognition algorithm. Further, the controller 110 reads one or more objects, which are the same as or similar to the result of the analysis, from the storage unit 160.

In general, the place item may include various items, such as a mountain, a sea, a field, an inside a building, and/or the like, and various items by one or more objects included in the items. For example, the item related to the place may include an item which may be directly associated with a place, such as a mountain, a sea, a field, a building, the east coast, and a west coast, and various items (e.g., a time, a friend, a person, and/or the like) by one or more objects displayed by each item. The controller 110 reads objects corresponding to the place, and classifies the read object according to the associated item. The controller 110 displays the plurality of objects corresponding to the items (e.g., a sea 820*b*, an east coast 830*b*, and a west coast 840*b*) associated with the place item 820*a* on the screen 810. The controller 110 displays the plurality of objects corresponding to the associated items on the screen 870.

Referring to FIG. 8C, a plurality of objects is displayed on the screen 810, and one or more items (e.g., the place item 820*c*, the time item 830*c*, and the person item 840*c*) are the same in the plurality of displayed objects. Each item may include information helpful for a user to recall or remember a memory about a photographed or received object. The controller 110 may analyze the one or more items included in the plurality of objects displayed on the screen 810. Further, the controller 110 may analyze the one or more items included in the plurality of objects displayed on the screen 810, and may determine a position, at which the one or more items are displayed, according to the item, which is included in the largest number of objects, or a predetermined priority.

As illustrated in FIG. 8C, the items included in the plurality of displayed objects 810*a* to 810*k* among the various items may have an order of the place item 820*c*, the time item 830*c*, and the person item 840*c*. The controller 110 displays the various items on one side of the screen 810 according to the order. FIG. 8C illustrates the display of the plurality of items on the right side of the screen 810. However, such a display is a merely an example, and according to various embodiments of the present disclosure, the plurality of items may be displayed on any of the upper, lower, left, and right sides, as well as the right side of the screen 810.

The controller 110 may detect that at least one object (e.g., the object 810*k*) is selected on the screen 810, and may detect that the selected object 810*k* is dragged to the person item 840*c* displayed on the right side of the screen 810. Further, the controller 110 may detect that the object 810*k* is moved to the person item 840*c* by various gestures by a hovering, as well as a drag by a touch. For example, when the object 810*k* is selected as denoted by reference numeral 850, and is dragged to the partial region of the screen 810, and then the drag is released as denoted by reference numeral (860 (e.g., in response to selection of the object 810 and the dragging to the partial region of the screen 810), the controller 110 may recognize (e.g., determine) an intention that a user currently desires to display the plurality of objects having the same place as that of the object 810*k*. Further, when the controller 110 recognizes the intention (e.g., in response to determining the intention), the controller 110 recognizes (e.g., determines) people included in the selected object 810*k*. Further, the controller 110 displays a plurality of objects corresponding to the same people as the people of the selected object 810*k* as illustrated in FIG. 8D.

Referring to FIG. 8D, when the object 810*k* is selected, and is dragged (850→860) to the person item 840*c* displayed on the screen 810 (e.g., in response to selection of the object 810*k* and a dragging to the person item 840), the controller 110 reads one or more objects having the same person as or a similar person to the person of the selected object 810*k* among the various objects pre-stored in the storage unit 160, and displays the read objects. Further, the controller 110 analyzes various items included in the read objects, and displays the analyzed items on one side of the screen 870 by various methods, such as a priority. For example, when the object 810*k* is selected in FIG. 8C (e.g., in response to selection of the object 810*k*), the controller 110 analyzes one or more people or objects included in the selected object 810*k*. Further, the controller 110 analyzes one or more people or objects included in the selected object 810*k* by adopting (e.g., using) the recognition algorithm. Further, the controller 110 reads one or more objects, which are the same as or similar to the result of the analysis, from the storage unit 160. In general, the people item may include various items, such as a name of a person and a relation with a user. Further, the people item may include various items by one or more objects associated with the items. The controller 110 reads objects corresponding to the person item, and classifies the read objects according to the item. The controller 110 displays the plurality of objects corresponding to sub items (e.g., a friend 820*d*, a baby 830*d*, and a wife 840*d*) of the person item 840 on the screen 870. The controller 110 displays the plurality of objects corresponding to the associated items on the screen 870.

Figure 9:
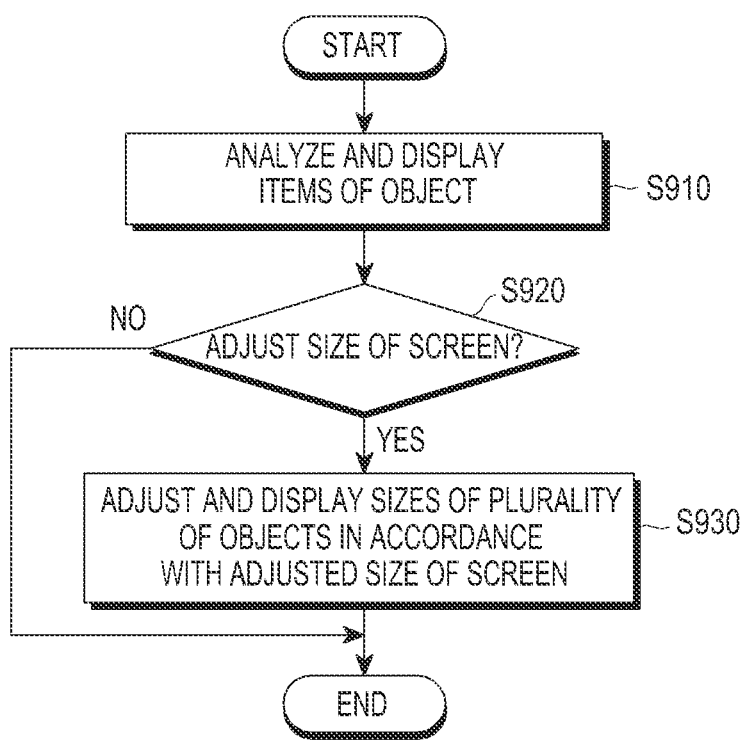
FIG. 9 is a flowchart illustrating a process of adjusting a size of a displayed object according to an embodiment of the present disclosure.

FIG. 9 is a flowchart illustrating a process of adjusting a size of a displayed object according to an embodiment of the present disclosure.

Hereinafter, a process of adjusting a size of a displayed object according to an embodiment of the present disclosure will be described in detail.

Referring to FIG. 9, at operation S910, the controller 110 analyzes an item of an object and displays the item. The controller 110 may display one or more objects on the screen 120 by analyzing the item of the object. For example, the controller 110 may analyze a time item included in the photographed picture, and may display a thumbnail of the photographed picture on the screen 120 in a form of a year-on-year or month-on-month calendar. Further, the controller 110 may display a thumbnail of a corresponding object on a map by analyzing a time item of the photographed picture.

At operation S920, the controller 110 may determine whether a size of at least a portion of the screen is adjusted. For example, the controller 110 may determine whether an input for adjusting a size of an object displayed on the screen is received.

If the controller 110 determines that the size of the screen is not adjusted at operation S920, then the controller 110 may end the process of adjusting a size of a displayed object.

In contrast, if the controller 110 determines that the size of the screen is adjusted at operation S920, then the controller 110 may proceed to operation S930 at which the controller 110 may adjust and display sizes of a plurality of objects in accordance with an adjusted size of the screen. For example, when a command for adjusting a size of the screen is detected (e.g., in response to detecting a command to adjust the size of the screen), the controller 110 displays the plurality of objects by adjusting the sizes of the plurality of objects in accordance with the adjusted size of the screen. The controller 110 may analyze various items for the photographed time and the photographed place of the one or more objects, and may display the plurality of objects on the screen 120 in a calendar type or a map type. As described above, when a zoom-in gesture or a zoom-out gesture is detected on the screen 120 after the display, the controller 110 may enlarge or reduce the size of the calendar or the map displayed on the screen 120 in accordance with the detected gesture. Further, the controller 110 may also enlarge or reduce the size of the thumbnail included in the calendar or the map in accordance with the size of the enlarged or reduced calendar or map.

FIGS. 10A, 10B, 10C and 10D are diagrams illustrating a process of adjusting a size of an object displayed in the calendar type according to an embodiment of the present disclosure.

Figure 10A:
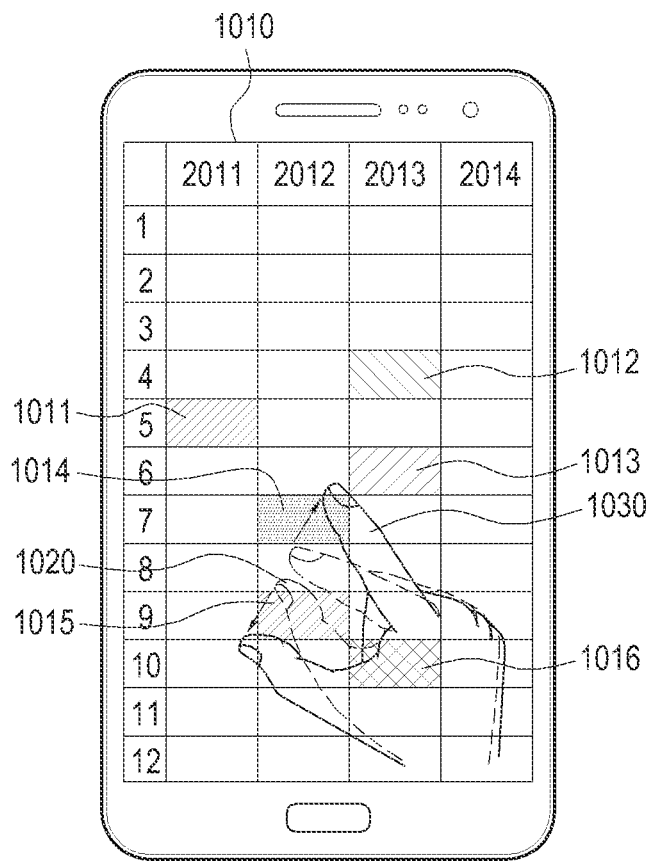
FIG. 10A is an example diagram illustrating a plurality of objects in a year-on-year calendar type according to an embodiment of the present disclosure.
Figure 10B:
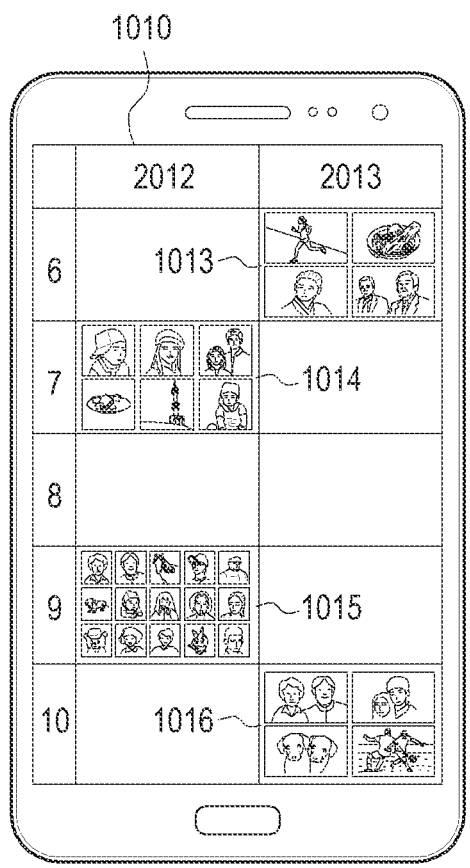
FIG. 10B is an example diagram illustrating an enlarged year-on-year calendar displaying a plurality of objects according to an embodiment of the present disclosure.
Figure 10C:
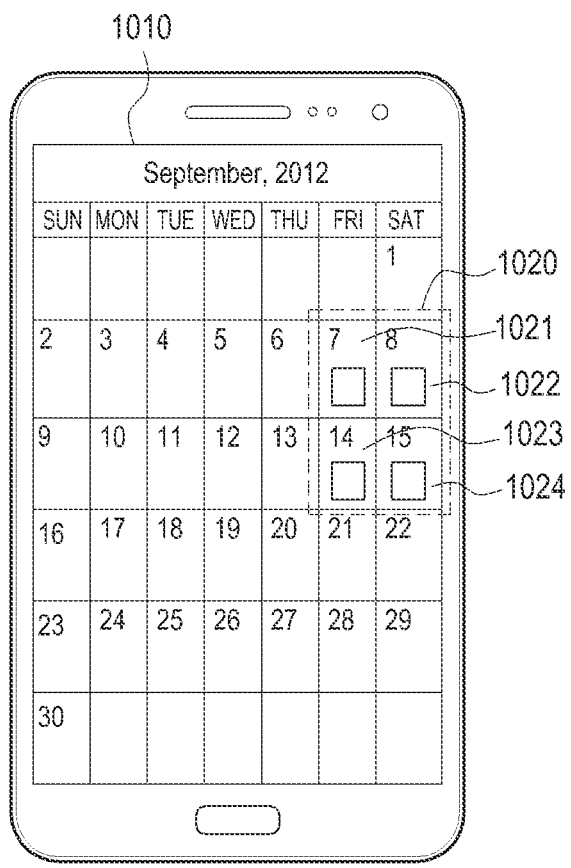
FIG. 10C is an example diagram illustrating a year-on-year calendar enlarged and displayed according to a month according to an embodiment of the present disclosure.
Figure 10D:
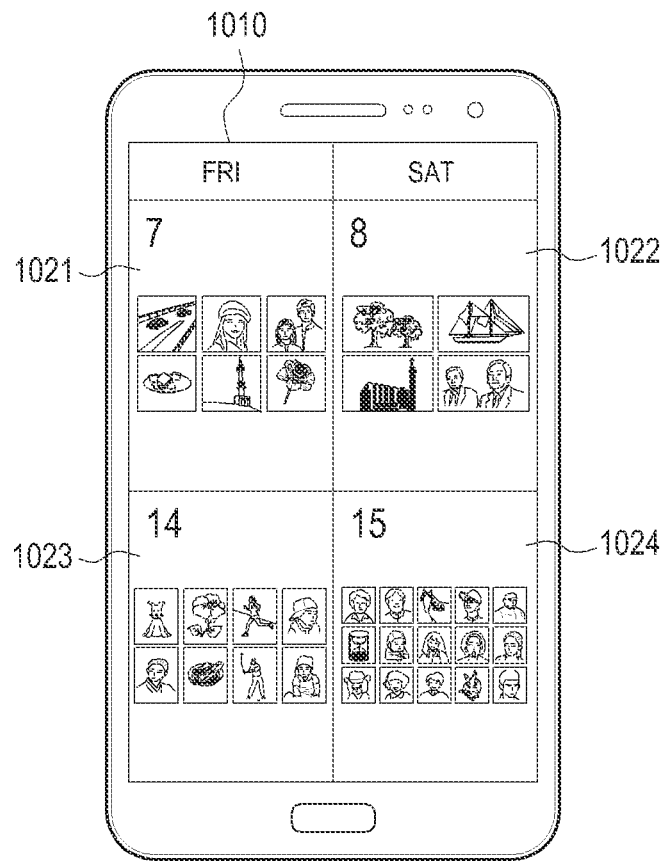
FIG. 10D is an example diagram illustrating a calendar, which is displayed according to a month and a day according to an embodiment of the present disclosure.

Referring to FIGS. 10A, 10B, 10C, and 10D, FIG. 10A is an example diagram illustrating a plurality of objects in a year-on-year calendar type according to an embodiment of the present disclosure, FIG. 10B is an example diagram illustrating an enlarged year-on-year calendar displaying a plurality of objects according to an embodiment of the present disclosure, FIG. 10C is an example diagram illustrating a year-on-year calendar enlarged and displayed according to a month, and FIG. 10D is an example diagram illustrating a calendar, which is displayed according to a month and a day.

Referring to FIG. 10A, the controller 110 may analyze date items included in the plurality of objects stored in the storage unit 160, and display one or more objects on a calendar in accordance with a year or a month corresponding to the date in which each objects is photographed. As illustrated in FIG. 10A, the object stored in the storage unit 160 includes one or more objects photographed or received on May, 2011 1011, July, 2012 1014, September, 2012 1015, April, 2013 1012, June, 2013 1013, and October, 2013 1016, and the controller 110 may analyze the date items of the one or more objects and display the plurality of objects. Further, the controller 110 may provide an indication capable of indicating the number of objects according to the number of objects corresponding to each year or month to the calendar. For example, when the number of pictures photographed on April and June, 2013 is small, and the number of pictures photographed on July, 2012 is large, a block 1014 of July, 2012 is darkly displayed, and blocks 1012 and 1013 corresponding to April and June, 2013, including the small number of pictures are lightly displayed.

According to various embodiments of the present disclosure, the controller 110 detects an input of the pinch (1020→1030) or an input of zoom-in or zoom-out in the state in which the calendar is displayed on the screen 1010. The controller 110 may enlarge or reduce the calendar in response to the detection. In this case, a size of a thumbnail included in the calendar may be adjusted in accordance with the enlargement or the reduction of the calendar. For example, the controller 110 may detect an input of the pinch the motion of the input at 1020 and the motion of the 1030. For example, a touch input corresponding to reference numeral 1020 and a touch input corresponding to reference numeral 1030 are moved closer together (e.g., a zoom-out command) or moved further apart (e.g., a zoom-in command).

Referring to FIG. 10B, when a pinch corresponding to zoom-in is input in FIG. 10A, the controller 110 detects the input pinch, and enlarges the calendar displayed on a screen 1010. Further, the controller 110 may enlarge a size of a thumbnail of one or more objects in accordance with the size of the enlarged calendar. The controller 110 may enlarge the calendar and set an initial focus or centering on corresponding to the location at which the pinch was detected. For example, if the controller 110 detects the input pinch as a zoom-in on or around a location corresponding to August 2012 and August 2013, then the controller 110 may enlarge the calendar and center the calendar on August 2012 and August 2013. When the user inputs a pinch in order to recognize the objects corresponding to July, 2012 1014, and September, 2012 1015, and the objects corresponding to June, 2013 1013, and October, 2013 1016 in more detail in FIG. 10A, the controller 110 enlarges and displays the corresponding months of the corresponding years in response to the input pinch and displays. As illustrated in FIG. 10B, it can be seen that the number of objects corresponding to July, 2012 1014 is a total of 6, the number of objects corresponding to September, 2012 1015 is a total of 15, and the number of objects corresponding to June, 2013 1013 and October, 2013 1016 is a total of 4. Each of the object may be displayed in the form of a thumbnail, and may be enlarged or reduced according to zoom-in or zoom-out of the calendar.

Referring to FIG. 10C, when a pinch corresponding to zoom-in is input in FIG. 10B, the controller 110 detects the input pinch, and enlarges the calendar displayed on the screen 1010. Further, the controller 110 may enlarge a size of a thumbnail of one or more objects in accordance with the size of the enlarged calendar, or display information on the objects in the calendar type. As illustrated in FIG. 10C, the user may input a pinch in order to view the objects corresponding to $7^{th}$ 2012, $8^{th}$ 1022, $14^{th}$ 1023, and $15^{th}$ 1024 of Sep., 2012 in more detail. Further, the controller 110 may detect the input of the pinch enlarging a partial region 1020 by the user, and enlarge and display the objects corresponding to $7^{th}$ 2012, $8^{th}$ 1022, $14^{th}$ 1023, and $15^{th}$ 1024 of September as illustrated in FIG. 10D.

Referring to FIG. 10D, the objects photographed or received on Sep. 7, 2012 is a total of 6, and are displayed in the block 1021, the objects photographed or received on Sep. 8, 2012 is a total of 4, and are displayed in the block 1022, the objects photographed or received on Sep. 14, 2012 is a total of 8, and are displayed in the block 1023, and the objects photographed or received on Sep. 15, 2012 is a total of 15, and are displayed in the block 1024. As illustrated in FIGS. 10A to 10D, one or more objects are enlarged in accordance with the zoom-in operation by repeatedly performing the zoom-in operation.

Figures 11A, 11B:
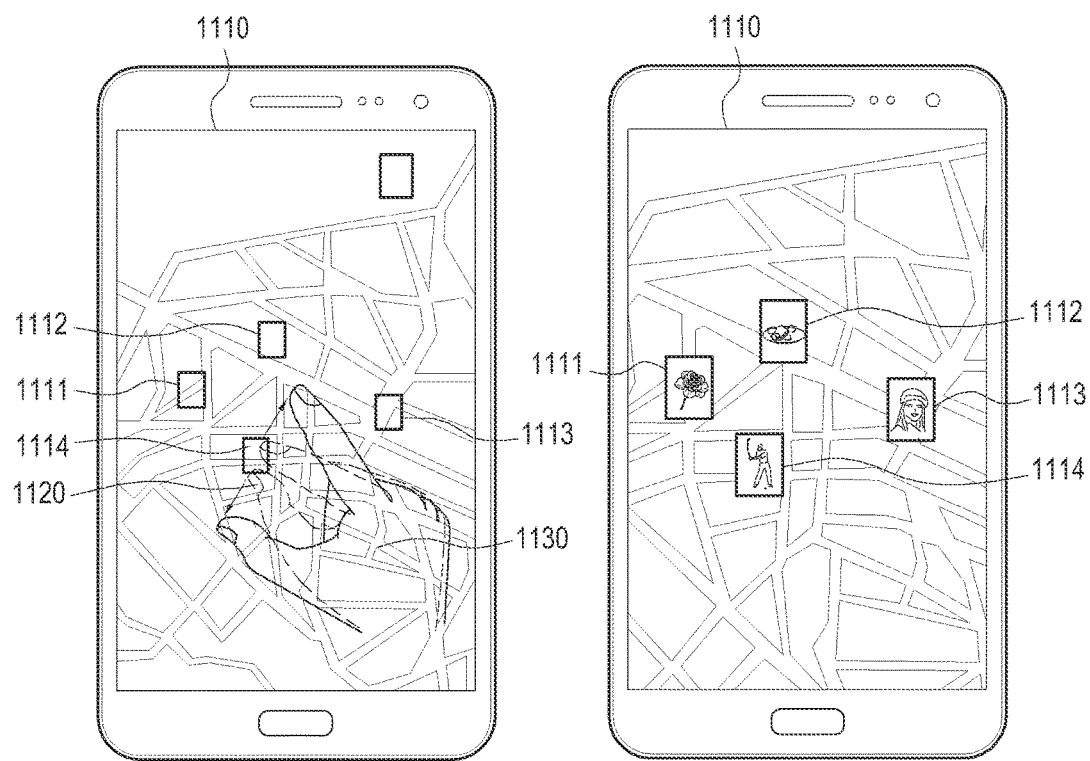
FIG. 11A is an example diagram illustrating a plurality of objects on a map according to an embodiment of the present disclosure.
FIG. 11B is an example diagram illustrating a plurality of objects enlarged by enlarging a map according to an embodiment of the present disclosure.

FIGS. 11A and 11B are diagrams illustrating a process of adjusting a size of an object displayed in the map type according to an embodiment of the present disclosure.

Referring to FIGS. 11A and 11B, FIG. 11A is an example diagram illustrating a plurality of objects on a map according to an embodiment of the present disclosure, and FIG. 11B is an example diagram illustrating a plurality of objects enlarged by enlarging a map according to an embodiment of the present disclosure.

Referring to FIG. 11A, objects stored in the storage unit 160 includes place information. The controller 110 may display the place information on a map on a screen 1110, and indicate a region at which the corresponding object is photographed. Corresponding objects are displayed in the form of the thumbnail at points at which the plurality of objects 1111, 1112, 1113, and 1114 is photographed. When the controller 110 detects an input of a zoom-in operation (1120→1130) for enlarging the map, the controller 110 enlarges the map in response to the input zoom-in operation and enlarges each object.

Referring to FIG. 11B, the map is enlarged by the zoom-in operation (1120→1130) in FIG. 11A, and the controller 110 enlarges and displays one or more objects 1111, 1112, 1113, and 1114 displayed on the corresponding points. When the zoom-in operation is repeatedly performed, the controller 110 enlarges the map and the thumbnails of the objects displayed on the map. In contrast, when the controller 110 detects a zoom-out operation, the controller 110 reduces the map and the thumbnails of the objects displayed on the map.

It will be appreciated that the embodiments of the present disclosure may be implemented in a form of hardware, software, or a combination of hardware and software. Any such software may be stored, for example, in a volatile or non-volatile storage device such as a ROM, a memory such as a RAM, a memory chip, a memory device, or an IC, or an optical or magnetic recordable and machine (e.g., computer) readable medium such as a CD, a DVD, a magnetic disk, or a magnetic tape, regardless of its ability to be erased or its ability to be re-recorded. It is appreciated that the storage unit included in the electronic device is one example of a program including commands for implementing various embodiments of the present disclosure or a machine-readable storage medium suitable for storing programs. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

Further, the electronic device can receive the program from a program providing apparatus connected to the device wirelessly or through a wire and store the received program. The program providing device may include a program including instructions allowing the electronic device to perform the method of controlling the screen, a memory for storing information required for the screen control method, a communication unit for performing wired or wireless communication with the electronic device, and a controller transmitting a corresponding program to the electronic device according to a request of the electronic device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a user interface including a plurality of objects in a screen of an electronic device, the method comprising:
    displaying, by a processor of the electronic device, a plurality of objects in a first area of the user interface;
    displaying, by the processor, a plurality of items classifying the displayed plurality of objects in a second area of the user interface;
    detecting, by the processor, a drag that moves an object to an item from among the displayed plurality of items in the second area, wherein the object is selected from among the displayed plurality of objects in the first area;
    in response to the drag, configuring, by the processor, the user interface such that a plurality of objects corresponding to the item are included in the first area of the user interface and a plurality of sub-items associated with the item are included in the second area of the user interface; and
    displaying, by the processor, the configured user interface in the screen of the electronic device.

2. The method of claim 1,
    wherein the plurality of items are updated in accordance with selection of an object among the plurality of objects.

3. The method of claim 2, further comprising:
    displaying, by the processor, a plurality of objects corresponding to the selection of the object in the first area of the user interface; and
    displaying items related to the displayed plurality of objects in the second area of the user interface.

4. The method of claim 1, wherein each of the plurality of objects includes a plurality of items, and the plurality of corresponding objects is displayed on the user interface in accordance with the selection of the item.

5. The method of claim 1, wherein the determined plurality of objects is displayed in the first area of the user interface according to a priority of an item included in each object.

6. The method of claim 1, further comprising:
    determining, by the processor, the plurality of objects corresponding to the item based on which the plurality of objects is classified;
    dividing, by the processor, the determined plurality of objects in accordance with a related item; and
    dividing, by the processor, the determined plurality of objects according to the item, based on which the determined plurality of objects is divided, and displaying the divided objects.

7. The method of claim 1, further comprising:
    displaying, by the processor, one or more objects including an item selected from among the displayed one or more items.

8. The method of claim 1, further comprising:
    automatically associating, by the processor, one or more items with a new object based on one or more items associated with at least one object having a similar feature to the new object.

9. An electronic device for controlling a user interface including a plurality of objects, the electronic device comprising:
    a screen; and
    a processor configured to:
        control the screen to display a plurality of objects in a first area of the user interface, and to display a plurality of items classifying the displayed plurality of objects in a second area of the user interface,
        detect a drag that moves an object to an item from among the displayed plurality of items in the second area, wherein the object is selected from among the displayed plurality of objects in the first area,
        in response to the drag, configure a user interface such that a plurality of objects corresponding to the item are included in the first area of the user interface and a plurality of sub-items associated with the item are included in the second area of the user interface, and
        display the configured user interface in the screen of the electronic device.

10. The electronic device of claim 9, wherein the plurality of items in accordance with selection of an object among the plurality of objects.

11. The electronic device of claim 10, wherein the processor is further configured to:
    display a plurality of objects corresponding to the selection of the object in the first area of the user interface, and
    display items related to the displayed plurality of objects in the second area of the user interface.

12. The electronic device of claim 9, wherein the processor is further configured to:
    analyze a plurality of items included in each of the plurality of objects, and display a plurality of corresponding objects in accordance with the selection of the item.

13. The electronic device of claim 9, wherein the processor is further configured to display the determined plurality of objects according to a priority of the item included in each of the determined plurality of objects.

14. The electronic device of claim 9, wherein the processor is further configured to:
   determine the plurality of objects corresponding to the item based on which the plurality of objects is classified,
   divide the determined plurality of objects in accordance with a related item,
   divide the determined plurality of objects according to the item, based on which the determined plurality of objects is divided, and
   display the divided objects.

15. The electronic device of claim 9, wherein the processor is further configured to:
   display one or more objects including an item selected from among the displayed one or more items.

16. The electronic device of claim 9, wherein the processor is further configured to:
   analyze the items of the plurality of objects and displays the analyzed items in the second area of the user interface,
   adjust sizes of the plurality of objects in accordance with a zoom-in gesture or a zoom-out gesture on the user interface, and
   display the plurality of objects of which the sizes are adjusted.

17. The electronic device of claim 16, wherein the processor is further configured to detect that the zoom-in gesture is repeatedly performed, so that the processor enlarges the sizes of the displayed plurality of objects and displays the enlarged plurality of objects.

18. The electronic device of claim 9, wherein the processor is further configured to:
   analyze items of the plurality of objects,
   display the plurality of objects on a map displayed on the user interface, and
   control sizes of the plurality of objects in response to a zoom-in gesture or a zoom-out gesture on the user interface.

* * * * *